US011884098B2

(12) United States Patent
Robertson et al.

(10) Patent No.: US 11,884,098 B2
(45) Date of Patent: Jan. 30, 2024

(54) NESTING PAINT TRAY AND PAINT BUCKET SYSTEM, PAINT TRAY, AND PAINT TRAY LINER

(71) Applicant: The Sherwin-Williams Company, Cleveland, OH (US)

(72) Inventors: Joshua R. Robertson, North Ridgeville, OH (US); Michael C. Lambertson, Jr., Aurora, OH (US); Sarah B. Mulroy, Rocky River, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 17/549,299

(22) Filed: Dec. 13, 2021

(65) Prior Publication Data

US 2022/0097447 A1 Mar. 31, 2022

Related U.S. Application Data

(63) Continuation of application No. 15/877,707, filed on Jan. 23, 2018, now Pat. No. 11,198,320.

(60) Provisional application No. 62/449,514, filed on Jan. 23, 2017.

(51) Int. Cl.
*B44D 3/12* (2006.01)
*B65D 21/02* (2006.01)

(52) U.S. Cl.
CPC ............. *B44D 3/126* (2013.01); *B44D 3/121* (2013.01); *B44D 3/128* (2013.01); *B65D 21/0233* (2013.01)

(58) Field of Classification Search
CPC ........ B44D 3/126; B44D 3/121; B44D 2/128; B65D 21/0233
USPC ..................................................... 220/495.02
See application file for complete search history.

(56) References Cited

U.S. PATENT DOCUMENTS

| | | | |
|---|---|---|---|
| 1,471,712 | A | 10/1923 | Sohnle |
| 1,895,611 | A | 1/1933 | Doak |
| 2,127,682 | A | 8/1938 | Ewing |
| 2,922,176 | A | 1/1960 | Bernhardt |
| 3,707,242 | A | 12/1972 | Golden et al. |
| 3,776,371 | A | 12/1973 | Linger |
| 3,829,926 | A | 8/1974 | Salladay |
| 4,509,226 | A | 4/1985 | Allison et al. |
| 5,085,317 | A | 2/1992 | Jensen |

(Continued)

FOREIGN PATENT DOCUMENTS

| | | |
|---|---|---|
| AU | 201714375 | 9/2017 |
| AU | 201715972 | 9/2017 |

(Continued)

*Primary Examiner* — J. Gregory Pickett
*Assistant Examiner* — Niki M Eloshway
(74) *Attorney, Agent, or Firm* — Cooper & Maersch LLC; Lorri W. Cooper

(57) ABSTRACT

A nesting paint bucket and tray system includes a paint bucket and a paint tray. The paint bucket has a spout extending outwardly from the perimeter of the paint bucket. The paint tray has a spout extending outwardly from the perimeter of the paint tray. The paint tray includes feet that extend along the length of the paint tray, with the feet positioned adjacent the side walls of the paint bucket. The paint bucket includes first and second roll off surfaces while the paint tray includes one paint roll off surface.

20 Claims, 25 Drawing Sheets

(56) References Cited

U.S. PATENT DOCUMENTS

| | | | | |
|---|---|---|---|---|
| 5,139,139 | A | 8/1992 | Goetz | |
| 5,316,137 | A | 5/1994 | Kyllonen | |
| 5,460,289 | A * | 10/1995 | Gemmell | B44D 3/12 220/495.02 |
| 5,472,111 | A | 12/1995 | Renfrew | |
| 5,511,279 | A | 4/1996 | Ippolito | |
| 5,645,164 | A | 7/1997 | Hocking | |
| 5,727,708 | A | 3/1998 | Erickson | |
| 5,810,196 | A | 9/1998 | Lundy | |
| 6,260,730 | B1 | 7/2001 | Fellman | |
| D461,288 | S | 8/2002 | Tennant | |
| 6,471,086 | B1 | 10/2002 | Fleckenstein | |
| 6,622,884 | B1 | 9/2003 | Gartner | |
| 6,996,872 | B2 | 2/2006 | Tennant | |
| D582,118 | S | 12/2008 | Chafe et al. | |
| D586,515 | S | 2/2009 | Arvinte | |
| 7,648,022 | B1 | 1/2010 | Freeauf | |
| 7,703,631 | B2 | 4/2010 | Chafe et al. | |
| 8,123,066 | B2 | 2/2012 | Chafe et al. | |
| D675,391 | S | 1/2013 | Arvinte | |
| D684,329 | S | 6/2013 | Church | |
| D694,975 | S | 12/2013 | Lambertson, Jr. et al. | |
| D694,976 | S | 12/2013 | Lambertson, Jr. et al. | |
| D694,979 | S | 12/2013 | Lambertson, Jr. | |
| 8,887,940 | B2 | 11/2014 | Kiceniuk, Jr. et al. | |
| D728,883 | S | 5/2015 | Kempton | |
| D838,071 | S | 1/2019 | Robertson et al. | |
| 10,787,029 | B2 | 9/2020 | Robertson et al. | |
| 2002/0056714 | A1 | 5/2002 | Schinkel | |
| 2003/0006156 | A1 | 1/2003 | McCracken | |
| 2003/0042262 | A1 | 3/2003 | Young | |
| 2004/0195248 | A1 | 10/2004 | Garcia | |
| 2005/0098564 | A1 | 5/2005 | Verbrugge | |
| 2005/0161460 | A1 | 7/2005 | Depasquale et al. | |
| 2005/0252920 | A1 | 11/2005 | Cumming et al. | |
| 2005/0269327 | A1 | 12/2005 | Chafe | |
| 2006/0054527 | A1 | 3/2006 | Hart | |
| 2006/0260086 | A1 | 11/2006 | Boehm | |
| 2008/0023426 | A1 | 1/2008 | Stahl | |
| 2009/0020451 | A1 | 1/2009 | Ospina | |
| 2009/0050632 | A1 | 2/2009 | Martin | |
| 2009/0127266 | A1* | 5/2009 | Arvinte | B44D 3/126 220/570 |
| 2009/0277913 | A1 | 11/2009 | Bergman | |
| 2010/0140275 | A1* | 6/2010 | Billado, Jr. | B44D 3/128 220/570 |
| 2010/0266767 | A1 | 10/2010 | DeHart | |
| 2011/0101000 | A1 | 5/2011 | Cutler, Sr. | |
| 2011/0163104 | A1 | 7/2011 | Hagen | |
| 2011/0297685 | A1 | 12/2011 | Sorenson | |
| 2012/0181286 | A1* | 7/2012 | Doe | B44D 3/121 220/553 |
| 2012/0223085 | A1* | 9/2012 | Bergman | B44D 3/126 220/570 |
| 2013/0068639 | A1 | 3/2013 | Plouffe | |
| 2013/0153580 | A1 | 6/2013 | Marino et al. | |
| 2015/0114968 | A1 | 4/2015 | Jolls | |
| 2015/0151566 | A1 | 6/2015 | Abuzarifah | |
| 2015/0336422 | A1 | 11/2015 | Tuzi | |
| 2018/0117956 | A1 | 5/2018 | Tuzi | |
| 2018/0207976 | A1 | 7/2018 | Robertson et al. | |
| 2021/0039427 | A1* | 2/2021 | Archard | B44D 3/126 |

FOREIGN PATENT DOCUMENTS

| | | | |
|---|---|---|---|
| AU | 201715973 | | 9/2017 |
| AU | 201715974 | | 9/2017 |
| CA | 176029 | | 7/2018 |
| CN | 203576441 | | 5/2014 |
| DE | 8312108 | | 12/1983 |
| EP | 1970217 | | 9/2008 |
| GB | 1547231 | | 6/1979 |
| GB | 2215376 | | 9/1989 |
| GB | 2399737 | | 9/2004 |
| GB | 6015765 | | 7/2017 |
| GB | 6015766 | | 7/2017 |
| GB | 6015767 | | 7/2017 |
| GB | 6015768 | | 7/2017 |
| GB | 2572726 | A | 10/2019 |
| GB | 2572917 | A | 10/2019 |
| WO | 1998058850 | | 12/1998 |
| WO | 2018136928 | | 7/2018 |
| WO | 2018136930 | | 7/2018 |

* cited by examiner

NESTING PAINT TRAY AND PAINT BUCKET SYSTEM, PAINT TRAY, AND PAINT TRAY LINER

CROSS-REFERENCE TO RELATED APPLICATION

This application is a continuation of U.S. patent application Ser. No. 15/877,707, filed Jan. 23, 2018, now U.S. Pat. No. 11,198,320, issued on Dec. 14, 2021, which claims priority to U.S. Provisional Patent Application No. 62/449,514, filed on Jan. 23, 2017, the disclosures of which are incorporated herein by reference in their entirety.

FIELD

The present invention relates to a paint tray, a paint tray liner, and a paint bucket system. More particularly, the present invention relates to a nesting paint tray and paint bucket system. In addition, the present invention relates to a paint tray having a gripping portion and a paint tray and paint tray liner having a tool holder.

BACKGROUND

A paint bucket that holds 5 gallons of paint is known and is typically used in commercial or industrial settings. One known 5-gallon paint bucket has two slanted inner surfaces or ramps that are used for rolling paint off a roller. Since two ramps are provided, the 5-gallon paint bucket can be used from either side. It is desirable to be able to cover a 5-gallon paint bucket so that paint can be stored in the bucket overnight. In addition, a user may wish to store a paint brush and/or paint roller inside a paint bucket overnight. In order to properly store paint overnight, the bucket needs to be covered. One type of cover is a lid that fits around the outer edges of the bucket. Another type of cover is a paint storage bag.

Paint trays and buckets have been provided with removable liners that are disposable or reusable. Paint tray/bucket liners are used to help to prevent the paint bucket or tray from being coated with paint, thus lengthening the life of the paint tray/bucket. Paint tray/bucket liners are oftentimes considerably less expensive than paint buckets or trays. The user can use the liner and then throw it away when completed. This helps to save clean up time.

SUMMARY

A nesting paint tray and bucket system is described herein. A paint tray and paint tray liner is described herein.

DETAILED DESCRIPTION

Figure 1:
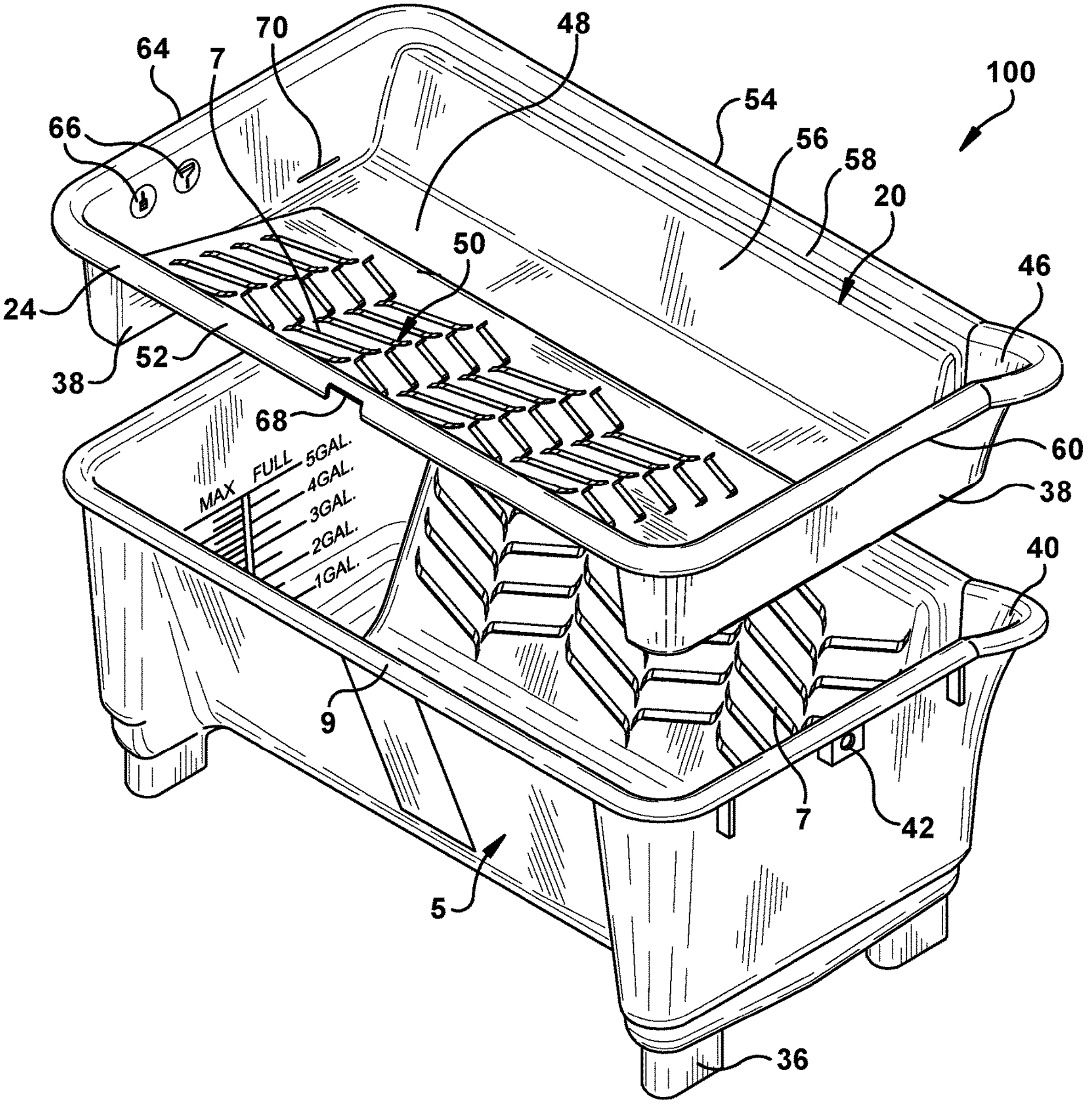
FIG. 1 is a perspective exploded view of a paint bucket with a paint tray according to the system of the invention.

The examples described herein are directed toward a paint tray 20, 22, a paint tray liner 30, 32, and a nesting system 10 for a paint tray 20, 22 and paint bucket 5. A known paint bucket 5 is shown and described in U.S. Design Pat. No. D694,975. The paint bucket has a roll off or grid pattern 7 that includes multiple raised chevrons. Any type of grid pattern may be used, if desired. The chevron pattern 7 shown in the figures is described in U.S. Design Pat. No. D694,979.

The system 10 according to the invention includes a paint tray 20 and a paint tray liner 30 that can be used with a paint bucket 5. The various parts nest with one another to provide the different parts of the system 5. The paint tray liner 30 nests in the corresponding paint tray 20 and the paint tray 20 nests on top of the paint bucket 5. Two different sizes of paint trays 20 are shown. A first paint tray is substantially the same length L and width W of the paint bucket 5 and has a lip 24 that seats over the upper edge 9 of the paint bucket 5. A known paint bucket 5 is designed for use with an 18" roller. Thus, for purposes of describing a first example paint tray 20, a paint tray that covers the entire upper end of the paint bucket 5 that is designed for use with an 18" roller, is referred to herein as an 18" paint tray 20.

The paint tray 20 has an upper lip 24 that mates with the upper edge 9 of the paint bucket 5 to form a seal such that the 18" paint tray 20 serves as a lid for the paint bucket 5. The paint tray 20 connection with the paint bucket 5 may or may not be air tight. The paint tray 20 serves as a lid that is intended to permit overnight storage of paint in the bucket 5, as well as overnight storage of a roller 26. While the paint tray 20 can serve as a lid for the underlying paint bucket 5, the paint tray 20 also advantageously provides an elevated work surface for the user. Thus, the 18" paint tray 20 can be used as a lid and/or as an elevated work surface for painting.

An alternative paint tray 22 has a length that is less than the length of the paint bucket 5. This alternative paint tray 22 permits a user to use paint in the paint bucket 5 and to use paint in the paint tray 22. The alternative paint tray 22 provides an elevated surface for the user while still permitting access to any contents in the paint bucket 5. The alternative paint tray 22 fits snuggly on the top edge of the paint bucket 5, but does not seal the upper opening of the paint bucket 5 because it does not entirely cover the opening of the paint bucket 5.

Paint tray liners 30, 32 may also be used with the system 10. The paint tray liners 30, 32 fit the contours of the respective paint trays 20, 22. As discussed above, the paint trays liners 30, 32 may be used to keep the paint tray 20, 22 clean and to reduce the amount of clean up when the project is completed. The paint tray liners 30, 32 serve an additional function in that one may be turned upside down and placed on top of another upwardly facing paint tray liner to serve as a temporary lid for the paint tray liner 30, 32. The paint tray liners 30, 32 may include a mating mechanism 28, 34 that permits the paint tray liners 30, 32 to mate with one another. The paint tray liner "lid" is not intended for overnight storage, but could be used for shorter term storage, such as lunch breaks.

Referring to the figures, FIGS. 1-10 depict an example paint tray 20 installed on a paint bucket 5. The paint bucket 5 shown is a dual roll off 5-gallon paint bucket that has four feet 36. The feet 36 include pockets for caster wheel attachment (not shown) but can be used with or without casters. The example paint trays 20, 22 do not have individual feet and instead have lower tray-like feet 38 that are designed to sit flat on the floor or another horizontal surface when not being used with the paint bucket 5. Thus, the paint trays 20, 22 can be used with or without the paint bucket 5 and have flat lower surfaces 38 that help to stabilize the paint trays 20, 22 during use on a flat surface.

FIG. 1 depicts an 18" paint tray 20 being installed on a paint bucket 5. As is evident, the outer contour of the paint tray must be able to seat inside the upper end of the paint bucket 5 and have a similar shape to the upper end of the paint bucket 5.

Figure 2:
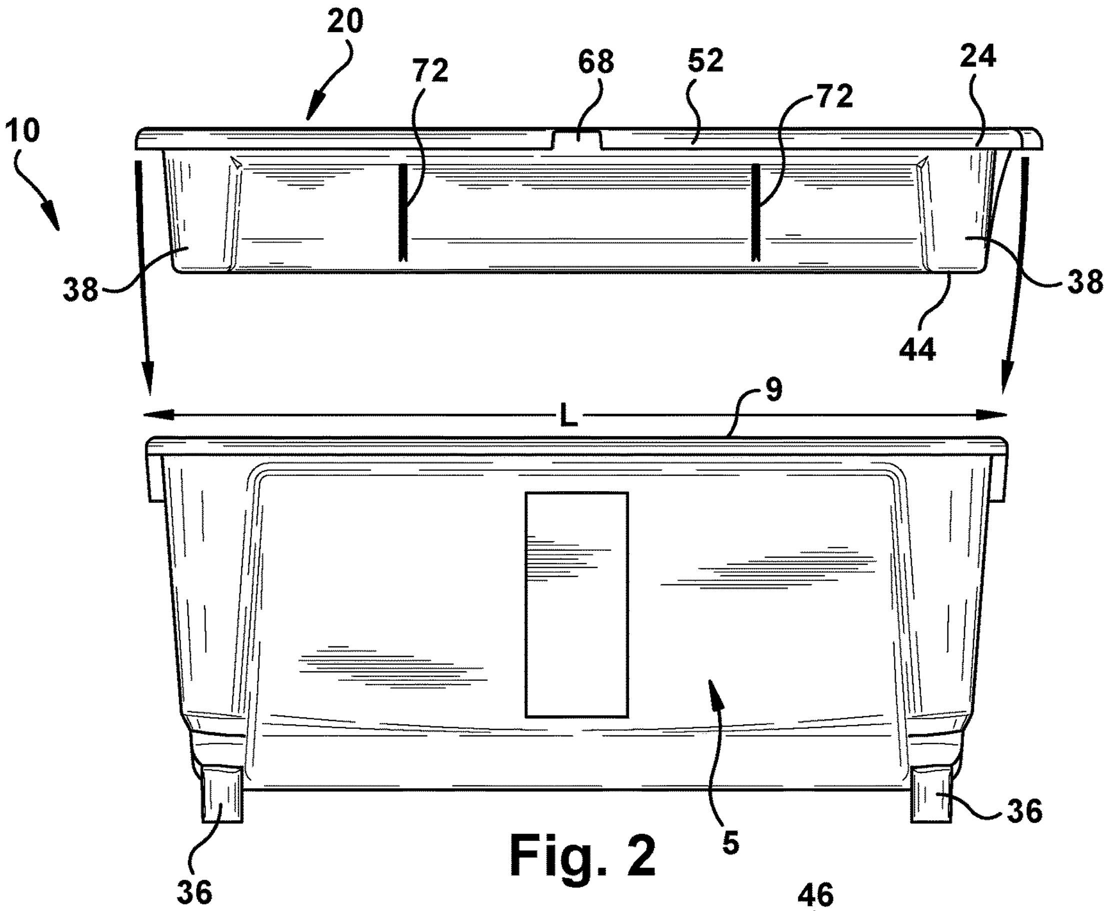
FIG. 2 is a front exploded view of the paint bucket and paint tray shown in FIG. 1.

FIG. 2 depicts a front view of the paint tray 20 being lowered into the paint bucket 5. The paint tray 20 has angled side surfaces that substantially match the angle of the inner surfaces of the bucket 5, although this is not absolutely required. The side surfaces of the paint tray 20 could be steeper, if desired, although a slope that matches the slope of the walls of the paint bucket 5 permits for a great surface area inside the well of the paint tray 20. The paint tray 20 has an open upper lip 24 that is designed to seat snuggly against the upper edge 9 of the paint bucket 5. The open upper lip 24 is open downwardly so as to cover the upper edge 9 of the paint bucket 5. The paint bucket 5 has a rounded upper edge 9 and the paint tray 20 has a similarly rounded upper lip 24 for mating with the upper edge 9 of the paint bucket 5. Other shapes could be used for the connection between the paint tray 20 and the upper edge 9 of the paint bucket 5, if desired.

The paint tray 20 seats in the paint bucket 5 in a single direction due to the spout 40 on the bucket 5. If a spout 40 is not provided and the paint bucket 5 has a uniform outer shape, the paint tray 20 could fit on the paint bucket 5 in either a front or rear direction, such that the direction of the paint tray 20 on top of the paint bucket 5 is changeable.

Figure 3:
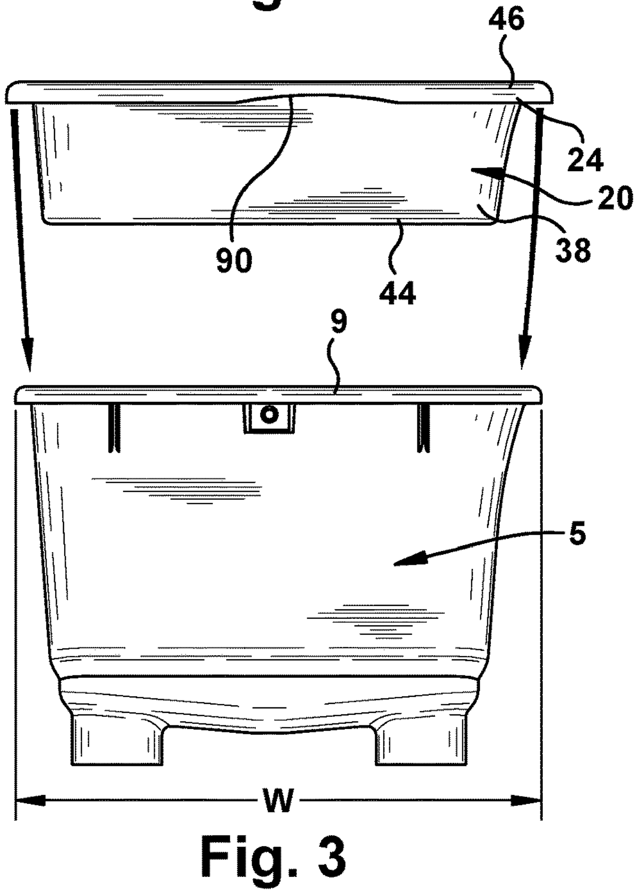
FIG. 3 is a side exploded view of the paint bucket and paint tray shown in FIG. 1.

FIG. 3 depicts an exploded side view of the 18" paint tray 20 prior to installation on the paint bucket 5. The paint bucket 5 has an attachment 42 for a handle and, as with FIG. 2, the paint tray 20 seats in a snug manner around the upper end of the paint bucket 5 such that the lip 24 of the paint tray 20 seats over the upper edge 9 of the paint bucket 5.

Figure 4:
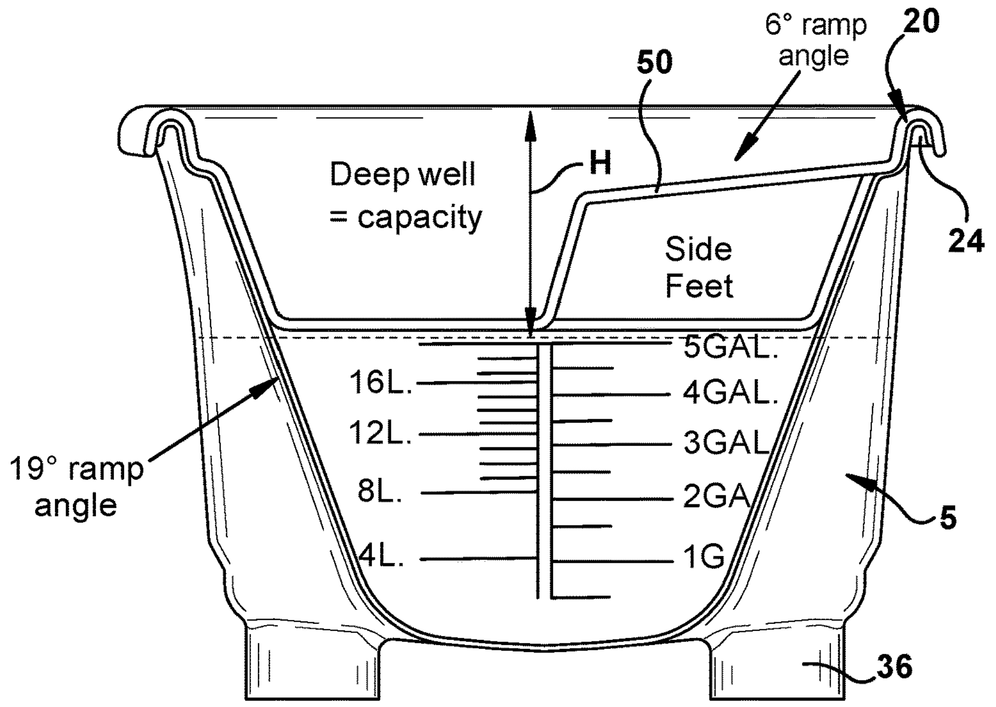
FIG. 4 is a side view of the paint bucket and paint tray of FIG. 1, with the paint tray installed on top of the paint bucket, and with paint filling the paint bucket.
Figure 5:
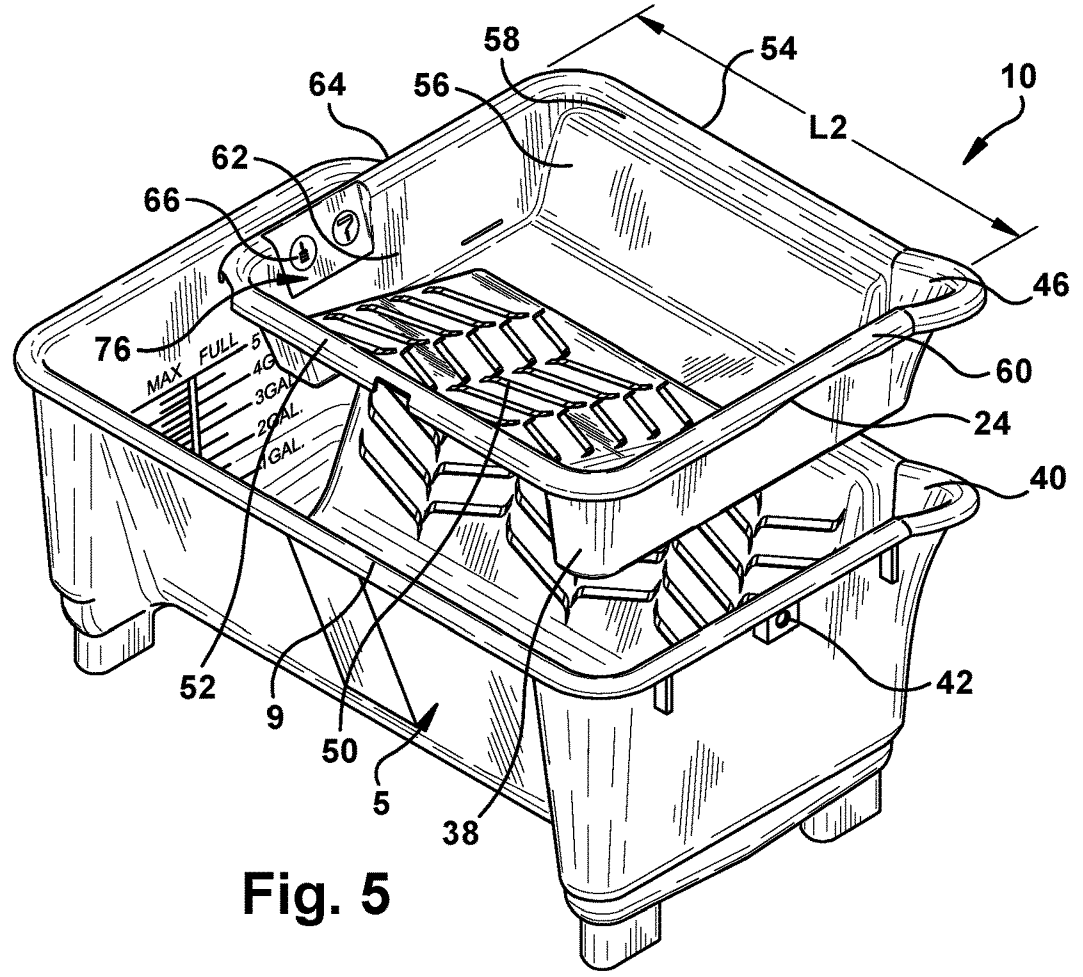
FIG. 5 is an exploded view of a paint bucket, like that in FIG. 1, but with an alternative paint tray according to the invention.

FIG. 4 depicts a side view of a paint bucket 5 with a paint tray 20 installed on top of the bucket 5. The height H of the paint tray 20 is designed such that when the 5-gallon paint bucket 5 is full of paint, the paint does not reach the bottom surface 44 of the paint tray 20. The depth of the paint tray 20 is dictated by the 5-gallon fill level of the paint bucket 5 because a user does not want the bottom 44 of the paint tray 20 to touch the paint in the paint bucket 5 when the bucket 5 is full and the paint tray 20 is being used as a lid. In the example shown, the paint tray 20 has a max depth of 4.1 inches.

FIGS. 5-10 depict an alternative paint tray 22 that has a length L2 that is less than the length L of the paint bucket. The paint tray 22 has a shape that matches the shape of the paint bucket 5. In the example shown, the paint bucket 5 has a pour spout 40, so the paint tray 22 also has a pour spout 46. The paint tray 22 could have a shape that is different from the paint bucket 5, as long as the paint tray 22 seats on top of the paint bucket 5 in a stable manner.

Figure 6:
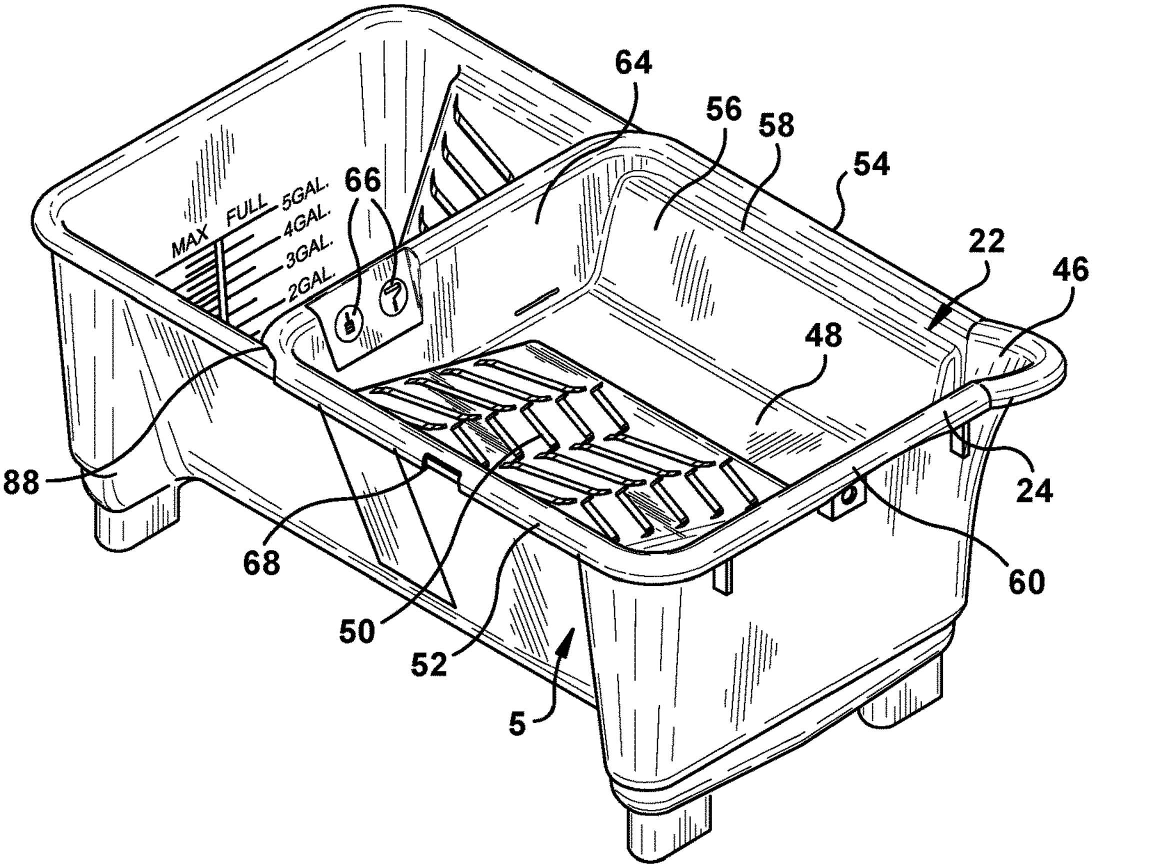
FIG. 6 is a perspective view of the paint bucket and paint tray of FIG. 5, with the paint tray in an installed position on the paint bucket.
Figure 7:
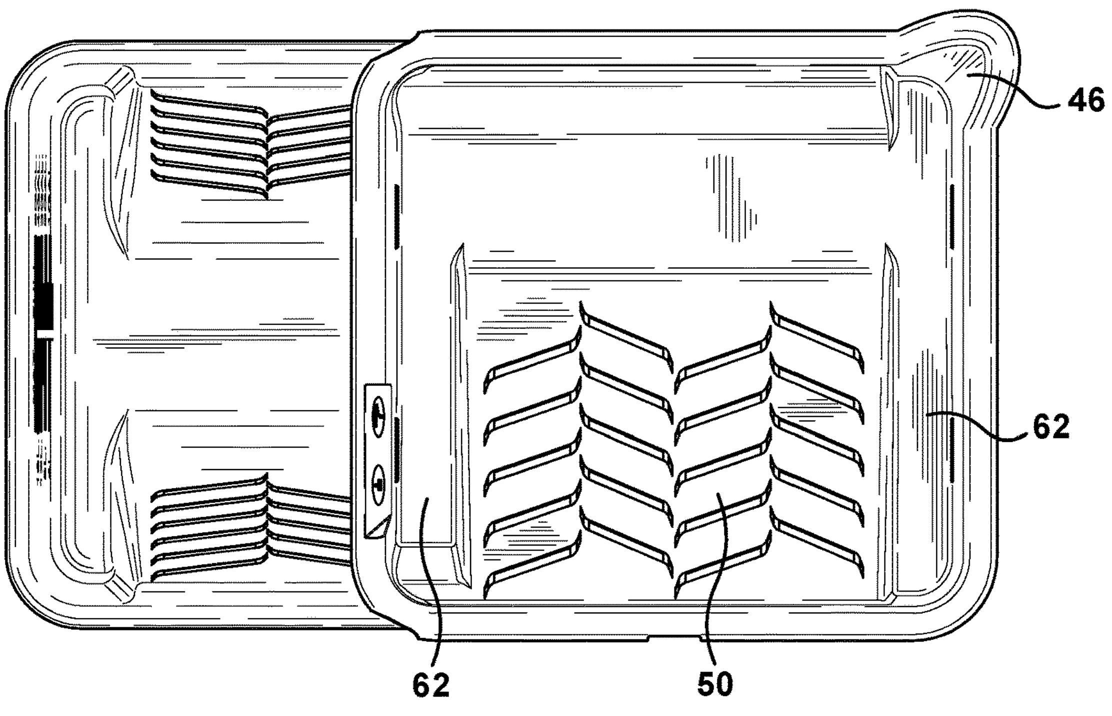
FIG. 7 is a top view of the paint bucket and paint tray of FIG. 6.

FIGS. 6 and 7 show the alternative paint tray 22 installed on the upper edge 9 of the paint bucket 5. Because the length L2 of the paint tray 22 is shorter than the length L of the bucket 5, the user is permitted access to the contents of the paint bucket 5, as well as to the contents of the paint tray 22.

Figure 8:
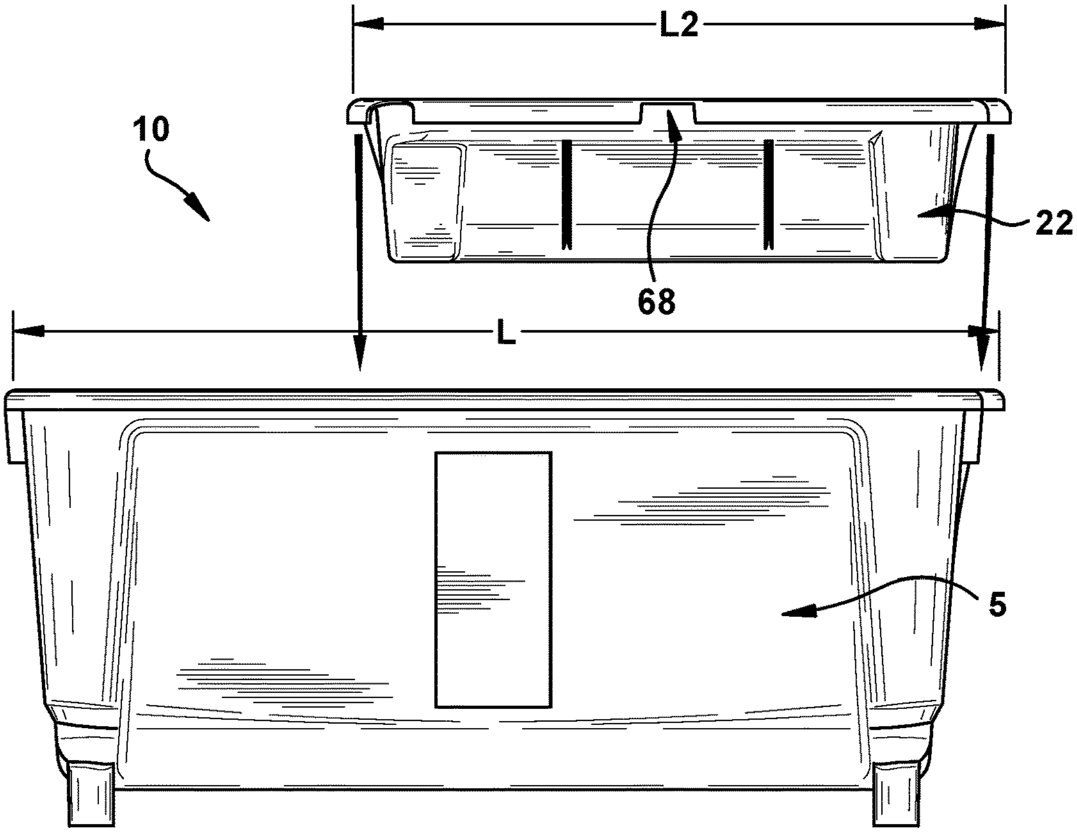
FIG. 8 is a front exploded view of the paint bucket and paint tray of FIG. 5 prior to installation of the paint tray on the paint bucket.
Figure 9:
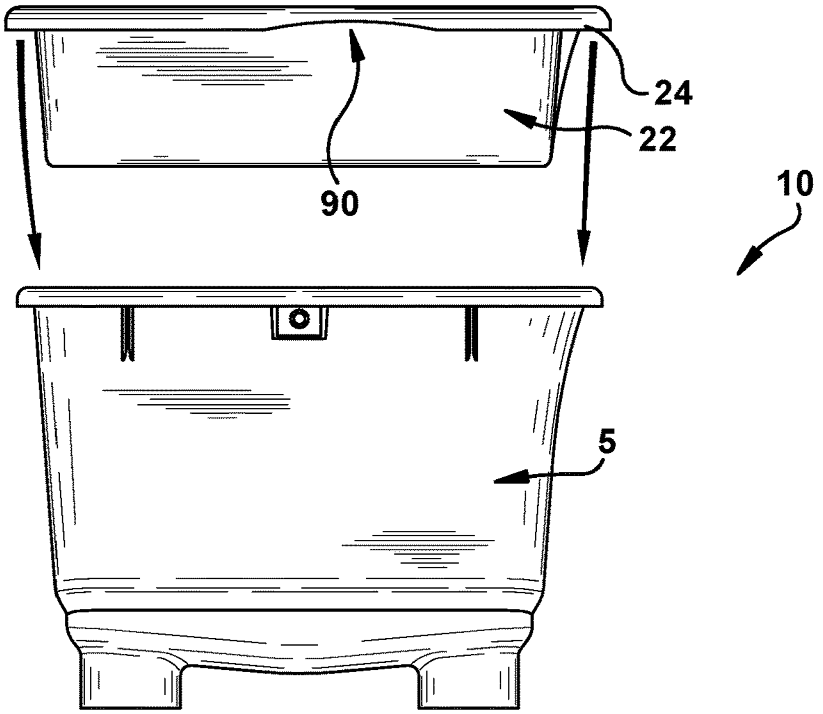
FIG. 9 is a side exploded view of the paint bucket and paint tray of FIG. 5 prior to installation of the paint tray on the paint bucket.

FIGS. 8 and 9 show the paint tray 22 before being lowered into the upper end of the paint bucket 5. The paint tray 22 has a width W that is substantially the same as the width W of the paint bucket 5 and a length L2 that is less than the length L of the paint bucket 5.

Figure 10:
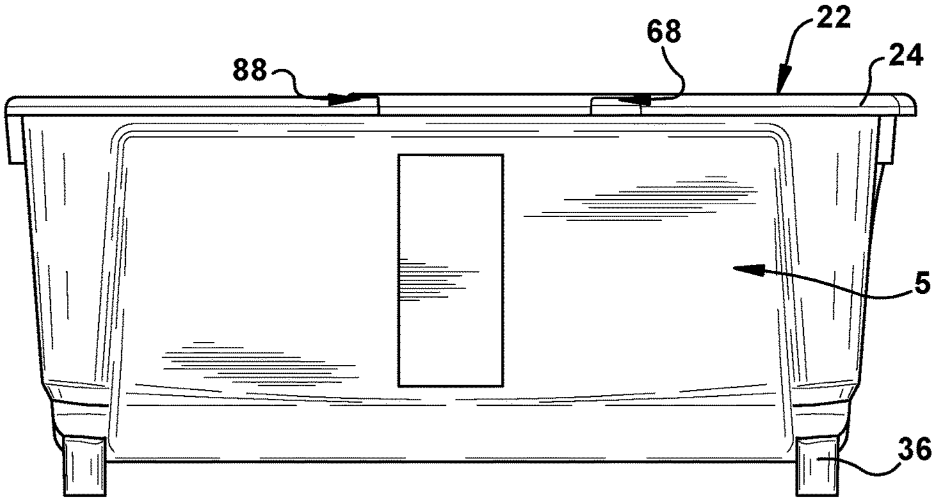
FIG. 10 is a front view of the paint tray installed on the paint bucket, as shown in exploded view in FIG. 5.
Figure 11:
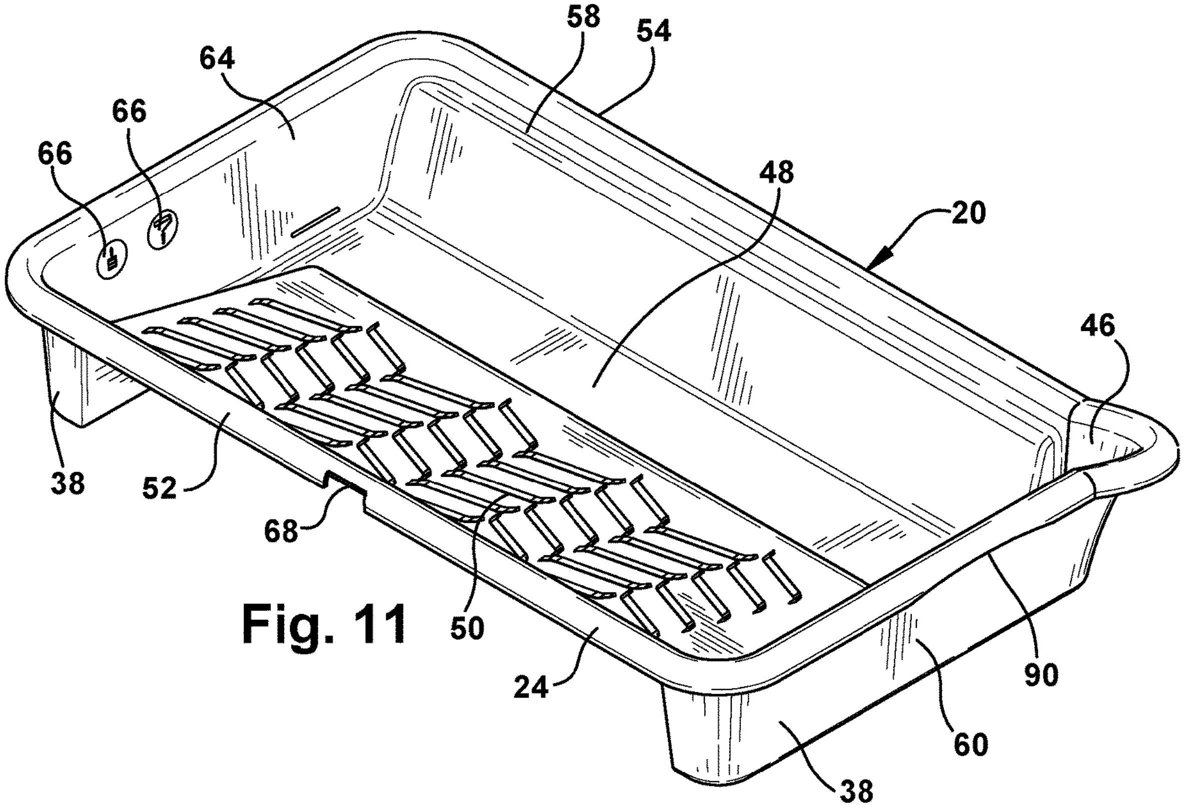
FIG. 11 is a front perspective view of an example paint tray, like that shown in FIG. 1.
Figure 12:
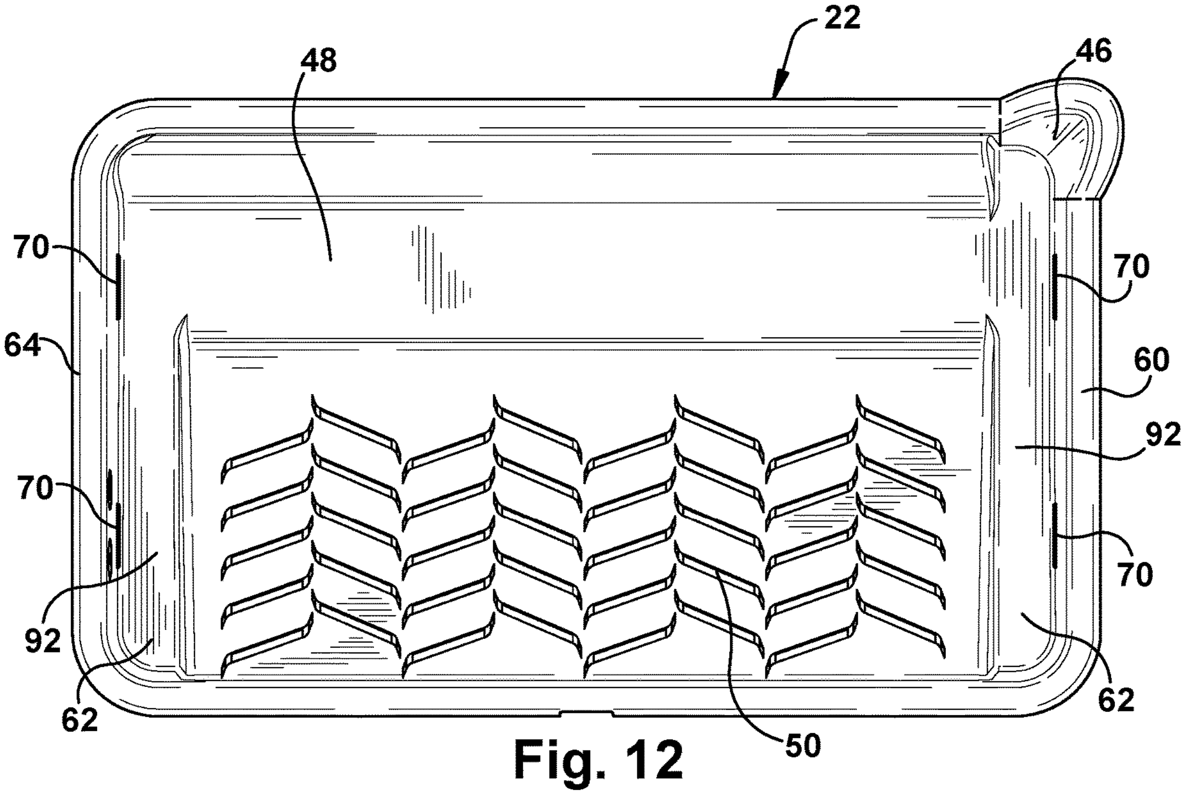
FIG. 12 is a top view of the paint tray of FIG. 11.

FIG. 10 depicts the alternative paint tray 22 installed on top of the paint bucket 5. The paint tray 22 mates with the upper edge 9 of the paint bucket 5. Because the paint tray 22 nests on top of the paint bucket 5, it creates an elevated work platform for the user. The alternative paint tray 22 (hereinafter referred to a "North American paint tray") shown in FIGS. 5-10 is well suited for different sized rollers, including the Canadian 240 mm roller (9.5"), and the US roller (9" long).

FIGS. 11-17 depict various views of the 18" paint tray 20 and FIGS. 18-24 depict various views of the North American paint tray 22.

As shown in FIGS. 11-17, the 18" paint tray 20 has an upwardly facing reservoir or well 48 for receiving paint. A slanted surface 50 extends from the front end 52 of the tray to a lower surface intermediate the front 52 and rear 54 of the paint tray 20. This slanted surface 50 serves as a roll-off surface for a roller 26 and includes a roll-off pattern 7. A reservoir or well 48 is formed in the bottom of the paint tray 20 for holding paint. This reservoir/paint well 48 is positioned between the end of the roll off surface 50 and the inner rear wall 56. The inner rear wall 56 is slanted rearwardly at an angle that is much steeper than the angle of the slanted roll-off surface 50. A ledge 58 is provided between the upper end of the rear inner wall and the upper edge of the paint tray 20. A pouring spout 46 is formed in a right, rear corner of the paint tray 20. The rear inner wall 56 ends at the pouring spout 46 such that the rear inner wall 56 does not extend to the right side wall 60 of the paint tray 20. Recesses or receptacles 62 are formed on either side of the roll off surface 50. These recesses 62 extend from the pouring spout 46 to the front wall 52 of the tray 20 on the right side 60 and from the rear inner wall 56 to the front wall 52 on the left side 64 of the paint tray 20. The recesses 62 provide some additional paint storage capacity and can also be used to store tools, such as paint brushes or mini rollers during use of the tray.

The tray 20 may include icons 66 that instruct the user that paint brushes or mini-rollers can be positioned in the recesses 62. These icons 66 can be molded into the plastic material of the trays or can be provided by stickers or other known means.

The entire upper edge of the 18" paint tray 20 has a lip 24 that has a curved lower surface that is designed to mate with the upper edge 9 of a paint bucket 5 and to provide a close connection between the tray 20 and the bucket 5 to temporarily seal the bucket 5. The lip 24 of the paint tray 20 also has sufficient strength to hold a filled paint tray 20 on top of the paint bucket 5. A notch 68 is formed in approximately the center of a lower surface of the upper edge/lip 24 of the paint tray 20 at the front end 52 of the tray 20. The notch 68 faces downwardly and is used to position the handle of a roller 26 during temporary storage. The notch 68 can also be used to pry the paint tray 20 from the bucket 5.

Figure 26:
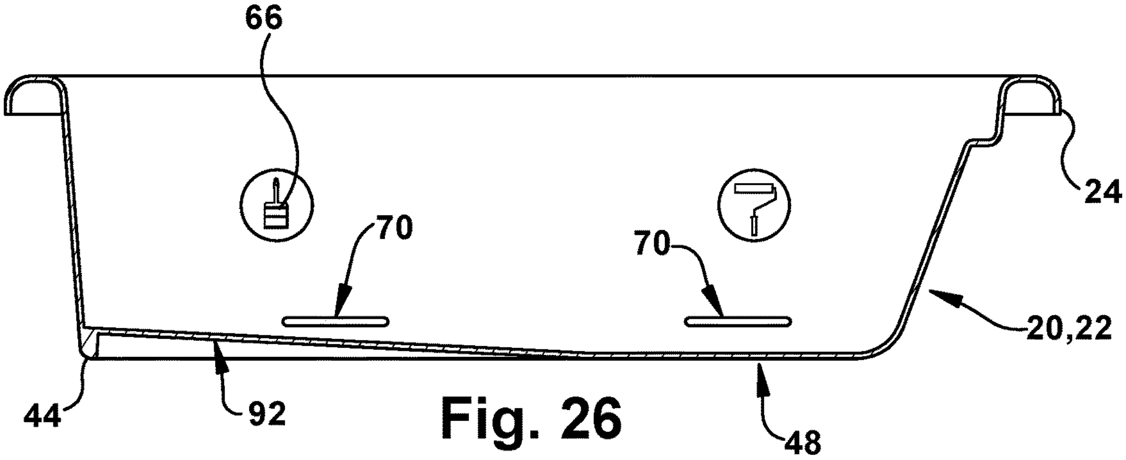
FIG. 26 is a cross-sectional view of the paint tray of FIG. 18.
Figure 27:
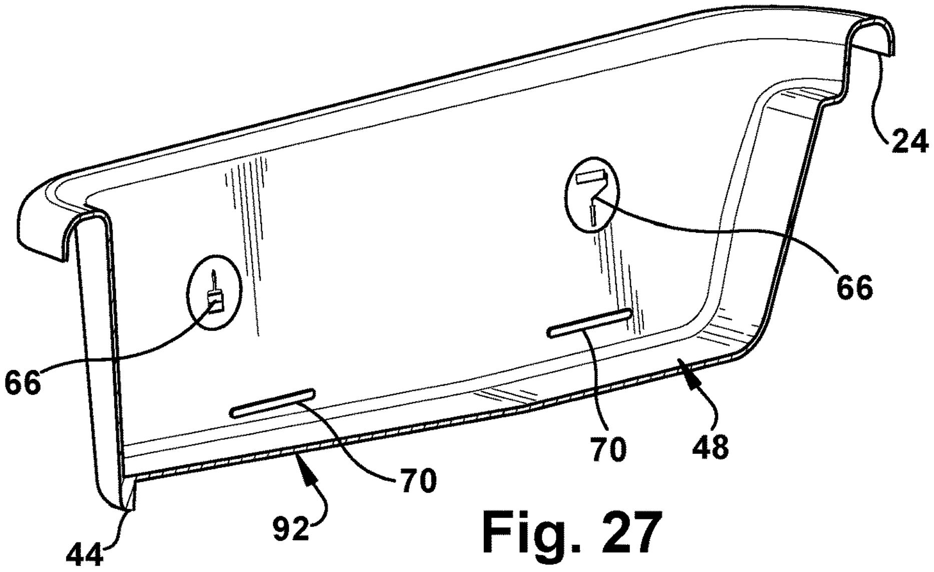
FIG. 27 is a perspective bottom cross-sectional view of the paint tray of FIG. 18.

The paint tray 20 includes nesting ribs 70 that are positioned on an inner surface of the side walls 60, 64 of the paint well 48 near the bottom inner surface of the paint tray 20. The ribs 70 are shown as being substantially horizontal and are spaced above the bottom inner surface of the paint tray 20. Four nesting ribs 70 are shown and the nesting ribs 70 extend inwardly from the side walls 60, 64. The nesting ribs 70 are used as a stop such that if multiple paint trays 20, 22 are installed on top of one another (such as during shipment or retail sales), they will not be wedged too tightly together such that they create a vacuum that prevents the consumer from separating them. Other shaped ribs could be used, as well as other means for preventing multiple paint trays from becoming wedged together. The nesting ribs 70 are also shown in FIGS. 26 and 27.

Figure 13:
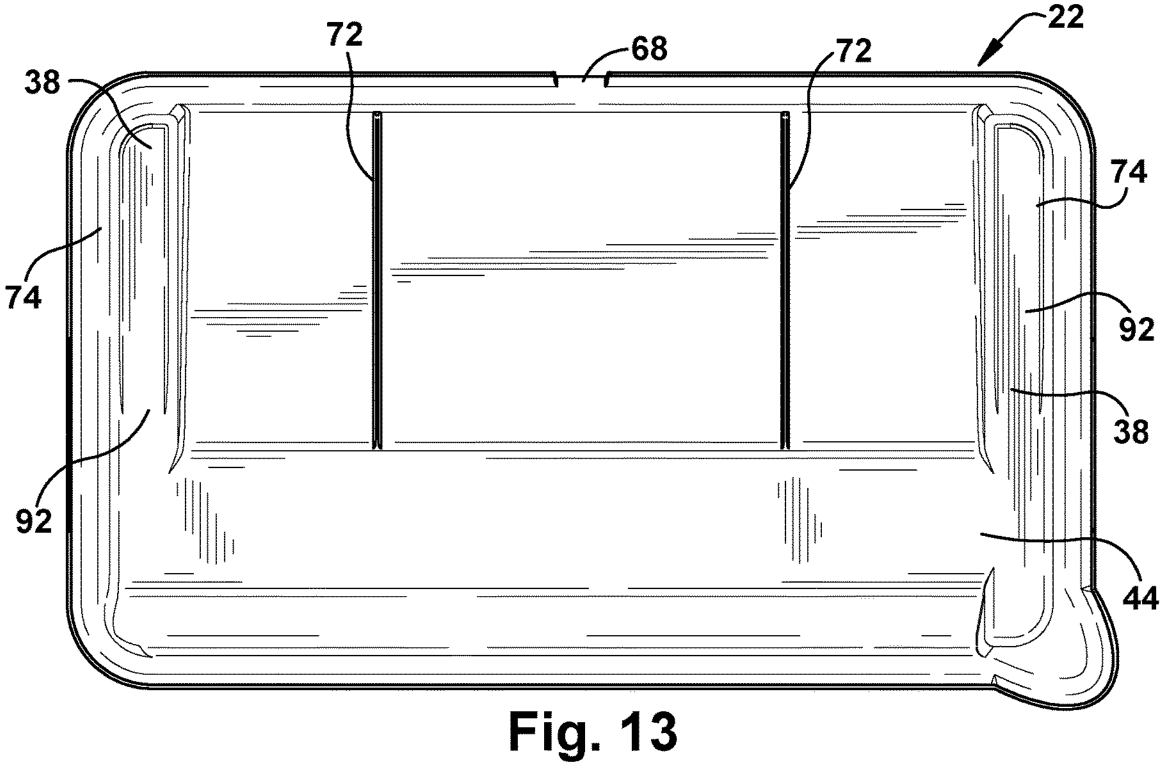
FIG. 13 is a bottom view of the paint tray of FIG. 11.
Figure 14:
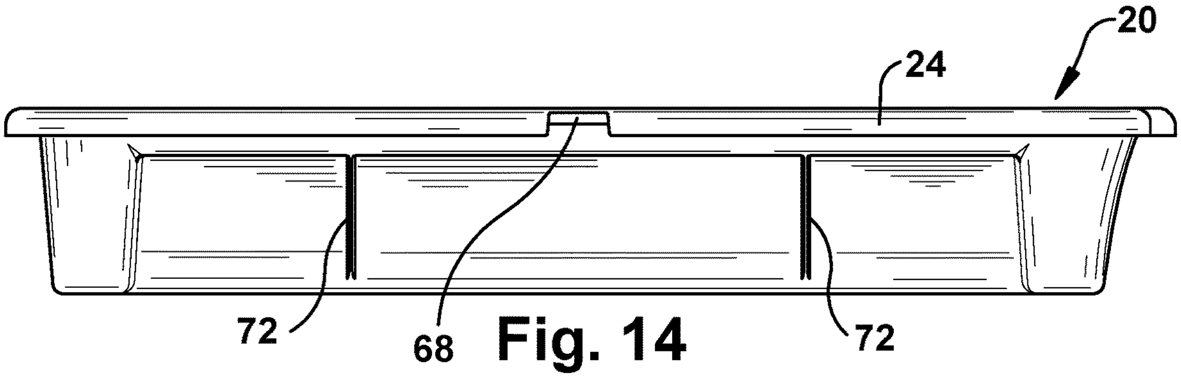
FIG. 14 is a front view of the paint tray of FIG. 11.
Figure 15:
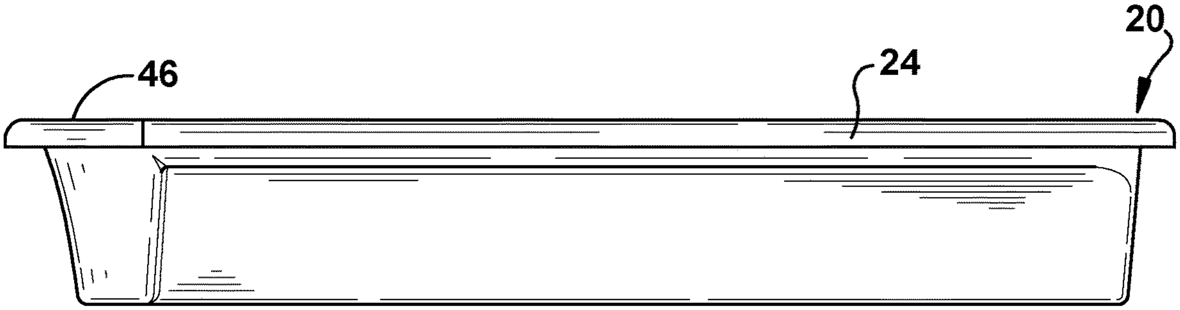
FIG. 15 is a rear view of the paint tray of FIG. 11.
Figure 16:
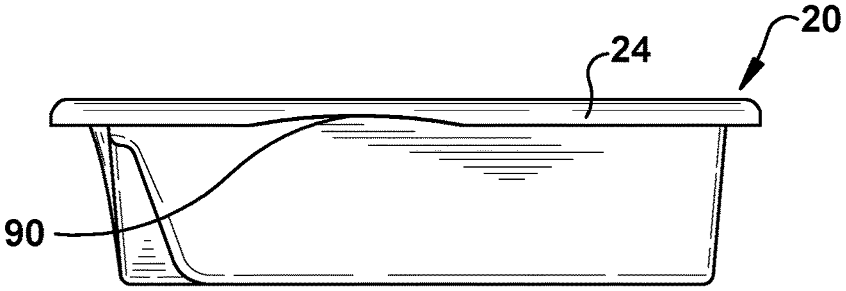
FIG. 16 is a left side view of the paint tray of FIG. 11.
Figure 17:
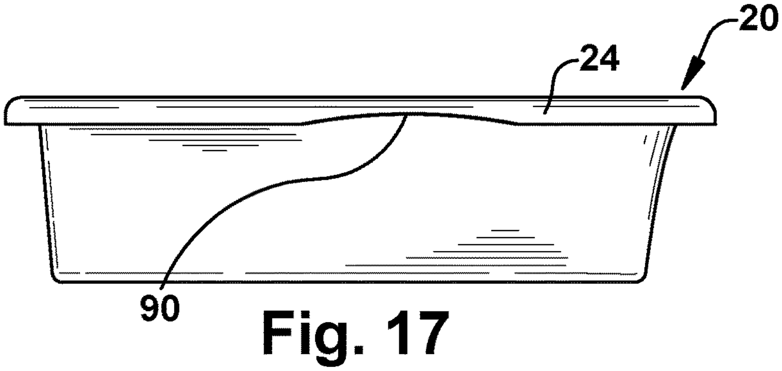
FIG. 17 is a right side view of the paint tray of FIG. 11.
Figure 18:
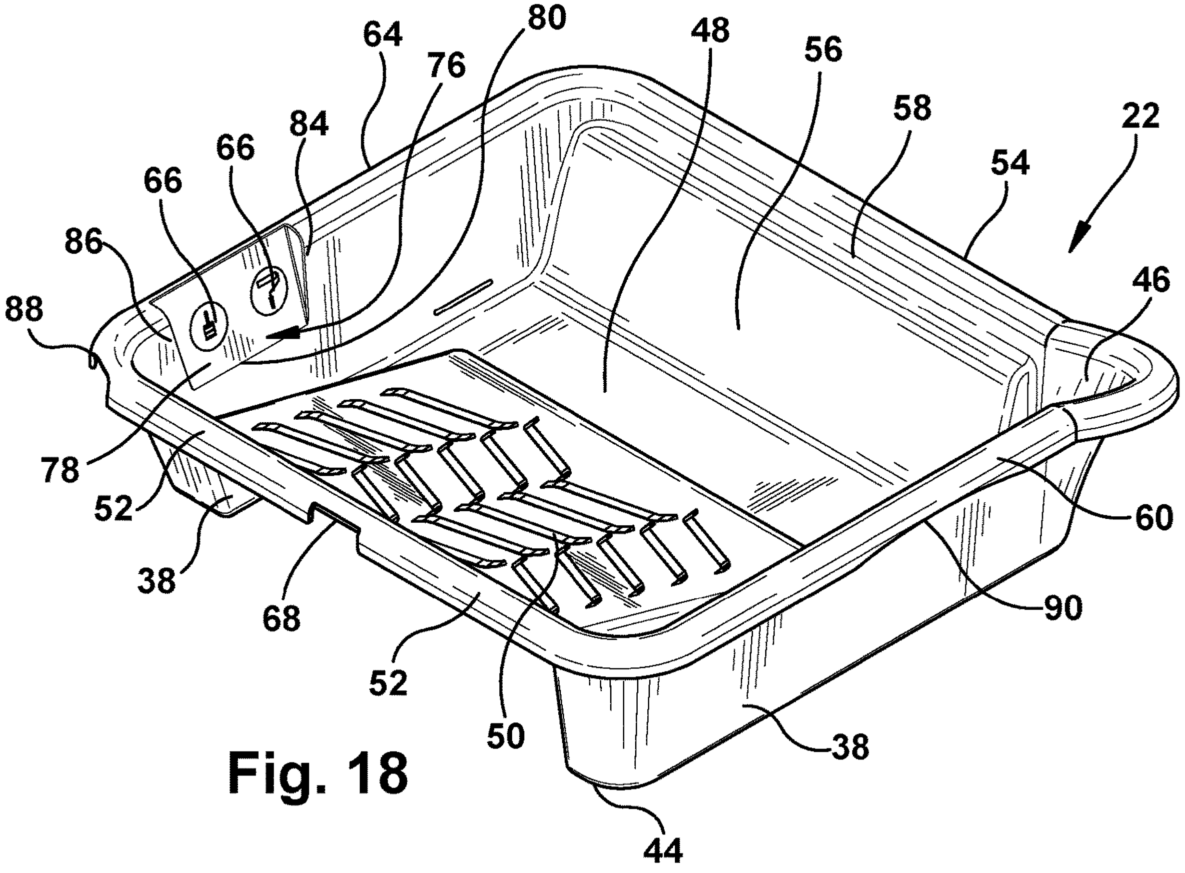
FIG. 18 is a front perspective view of an alternative example paint tray, like that shown in FIG. 5.
Figure 19:
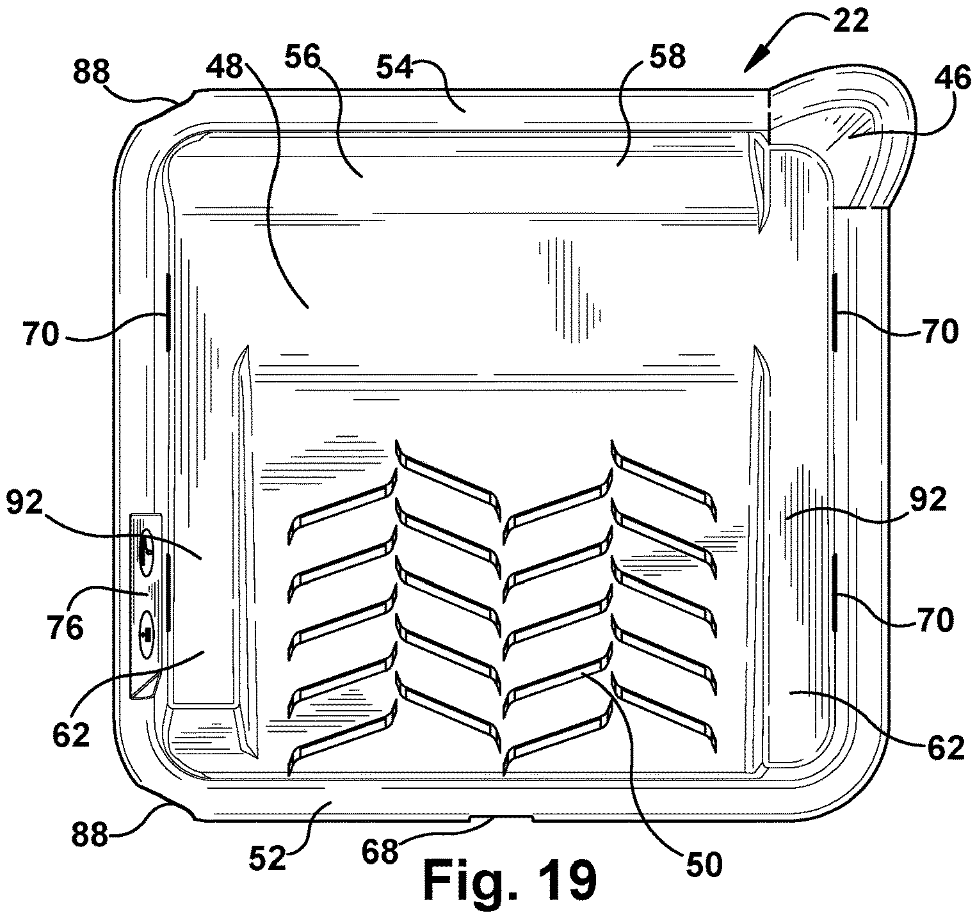
FIG. 19 is top view of the paint tray of FIG. 18.
Figure 20:
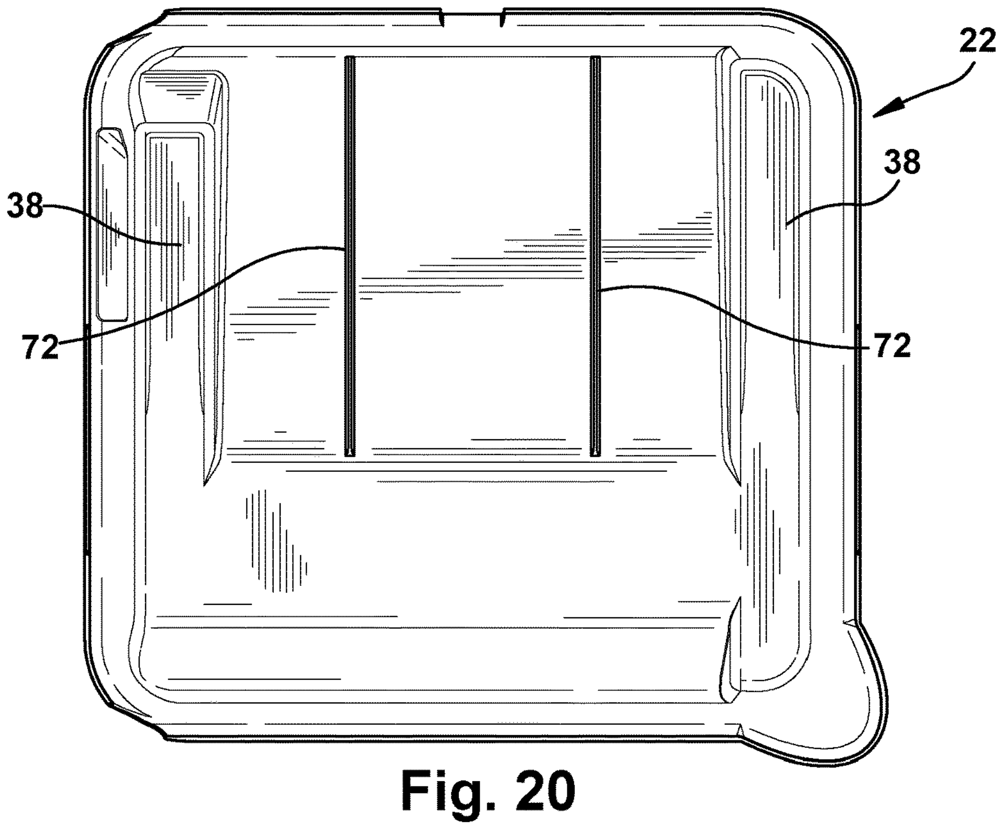
FIG. 20 is a bottom view of the paint tray of FIG. 18.
Figure 21:
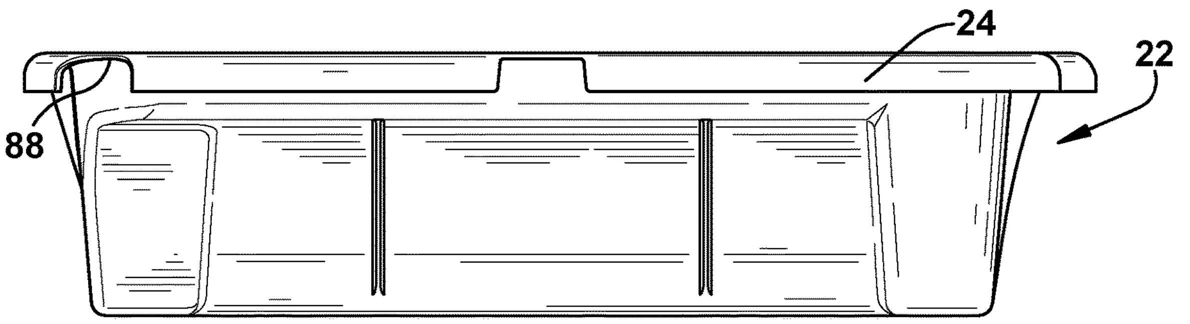
FIG. 21 is a front view of the paint tray of FIG. 18.
Figure 22:
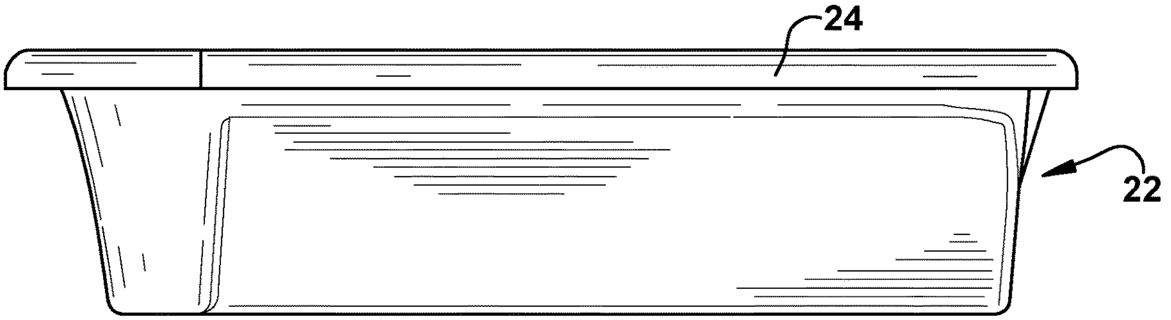
FIG. 22 is a rear view of the paint tray of FIG. 18.
Figure 23:
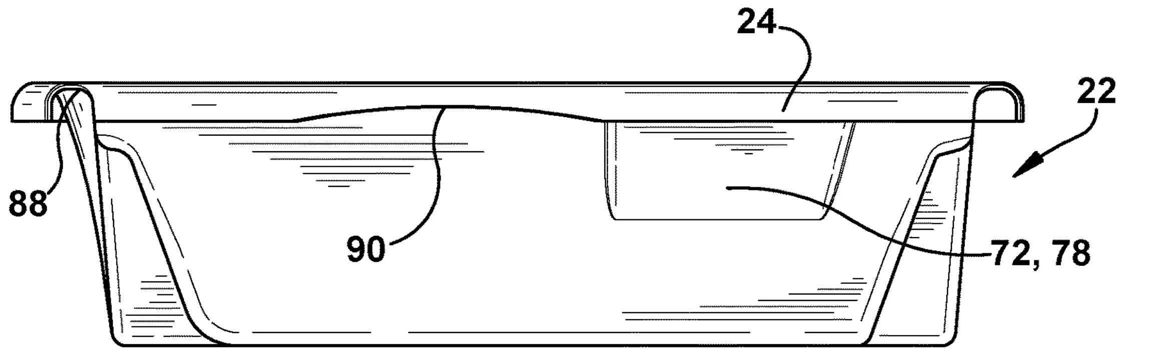
FIG. 23 is a left side view of the paint tray of FIG. 18.
Figure 24:
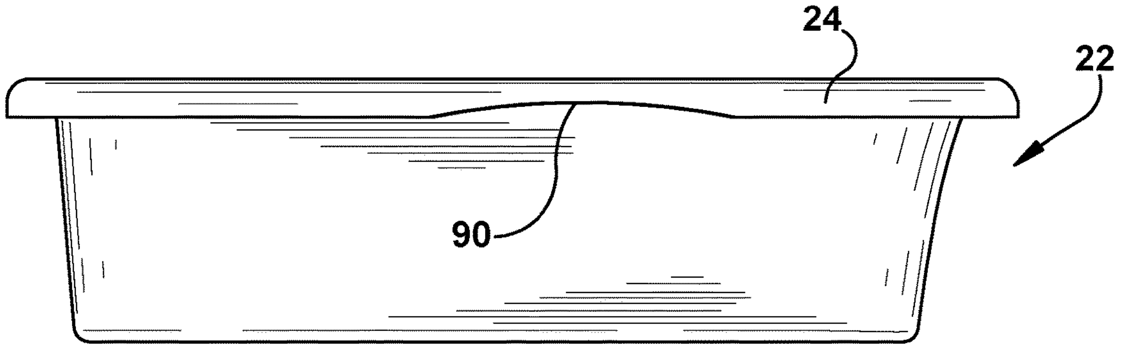
FIG. 24 is a right side view of the paint tray of FIG. 18.

FIG. 13 depicts a bottom surface 44 of the paint tray 20. Long, flat feet 38 are formed on the bottom surface 44 of the paint tray 20 adjacent either side of the roll-off ledge 50. The feet 38 form recesses 62, as described above, inside the paint tray 20. The feet 38 help to stabilize the paint tray 20 on a flat surface when the paint tray 20 is used alone. Strengthening ribs 72 may be used on the lower surface beneath the roll off surface 50. These ribs 72 can also serve the purpose of spacing paint trays 20 apart when they are stacked on top of each other. Two straight ribs 72 are shown that extend from the top to the bottom of the roll off surface 50. Any number of ribs 72 could be provided from none or more. Differently shaped ribs 50 could be used, if desired. The shape of the feet 38 will be described in greater detail below. However, the feet 38 have an upper slanted surface inside the paint receptacles 62 that permits paint that settles in the paint receptacles 62 to flow into the paint well 48 adjacent the rear wall 56. To accommodate this slanted surface in the receptacles 62, the bottom surface 44 of the paint tray 20 has raised surfaces 74, shown as ribs, that make the feet rest flat on a surface.

FIGS. 18-24 depict the North American paint tray that also nests in the upper end of the paint bucket 5. The North American paint tray 22 has a shape that is substantially the same as the 18" paint tray 20, except the North American paint tray 22 is shorter than the length L of the 18" paint tray 20. As with the 18" paint tray 20, the roll off surface 50 on the paint tray 22 only faces in one direction and is angled downwardly or slanted from the front wall 52 of the paint tray 22 to the bottom inner surface of the paint tray 22. A reservoir/paint well 48 is formed in the lower end of the paint tray for paint storage, with a majority of the well formed between the bottom end of the roll off ramp 50 and the rear wall 56. The roll off ramp 50 does not extend along the enter length L2 of the paint tray 22 and recesses/receptacles 62 are formed on both sides of the ramp 50 that coincide with the feet 38 of the paint tray 22. These recesses 62 communicate with the paint well 48 formed between the bottom end of the roll off ramp 50 and the rear wall 54. Thus, the paint well area 48 is substantially U-shaped. The bottom surface of the recesses 62 positioned adjacent the roll off ramp 50 are associated with the feet 38 of the paint tray 22.

The recesses 62 formed by the feet 38 extend from the rear wall 54 along the sides of the roll off surface 50 to the front wall 52 of the paint tray 22.

One difference between the North American paint tray 22 and the 18" paint tray 20 is that the North American paint tray 22 has a tool receptacle 76 positioned on the left side 64 of the paint tray 22. The tool receptacle 76 is formed as a notch 78 into the left side wall 64 of the North American paint tray 22. The 18" paint tray 20 covers the entire open end of the paint bucket 5, but the North American paint tray 22 only covers a portion of the upper opening of the paint bucket 5. The paint tray 22 has a pour spout 46 that conforms the shape of the paint tray 22 to the pour spout 40 of the paint bucket on the right side of the bucket 5. Since the Left side 64 of the North American paint tray 22 is positioned intermediate the side walls of the paint bucket, the left side of the paint tray 22 does not have to mate with the upper end of the paint bucket 5. Because the left side 64 of the North American paint tray 22 hangs over a central area of the paint bucket 5 opening, it is not necessary for the left side wall 64 to be able to conform to the wall of the paint bucket 5. This permits a tool receptacle 76 to be formed on the left side wall 64 of the paint tray 22.

The tool receptacle 74 is formed directly above the recess 62 formed by the adjacent foot 38 of the paint tray 22. Thus, paint can pool and be stored in the recess 62 formed by the foot 38 of the tray 22 adjacent the roll off surface 50. The tool receptacle 74 is formed as a notch 78 or indentation in the side wall 64 of the paint tray 22. The notch 78 shown is trapezoidal in shape. The notch 78 is formed directly in the left side wall 64 of the paint tray 22 and has a bottom surface 80 that is spaced from the surface of the side recesses 62. The notch 78 extends to the upper edge of the paint tray 22 and cuts into the upper lip 24 of the paint tray 22. As such, the tool receptacle 74 narrows the upper lip 24 of the paint tray 22 in the area of the notch 78. The bottom edge 80 of the tool receptacle 76 is flush with the side wall of the paint tray 22 and the inner surface 82 of the tool receptacle 76 is angled inwardly from the bottom edge 80 of the receptacle 76 to the top edge of the receptacle 76 to form a ramped surface. The tool receptacle 76 forms a depression in the left side wall 64 with a maximum depth of the depression being at the upper end at the upper lip 24 of the tray 22.

Figure 28:
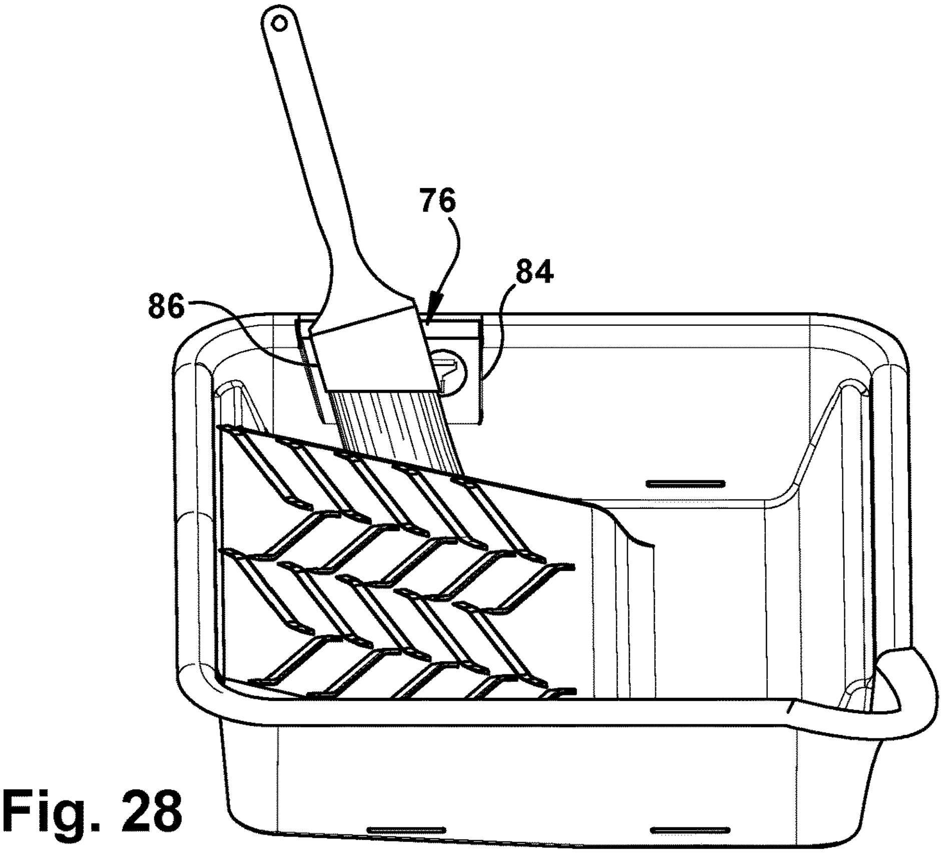
FIG. 28 is a right side perspective view of the paint tray of FIG. 18, showing a brush installed in a tool receptacle notch on the left side of the paint tray.
Figure 29:
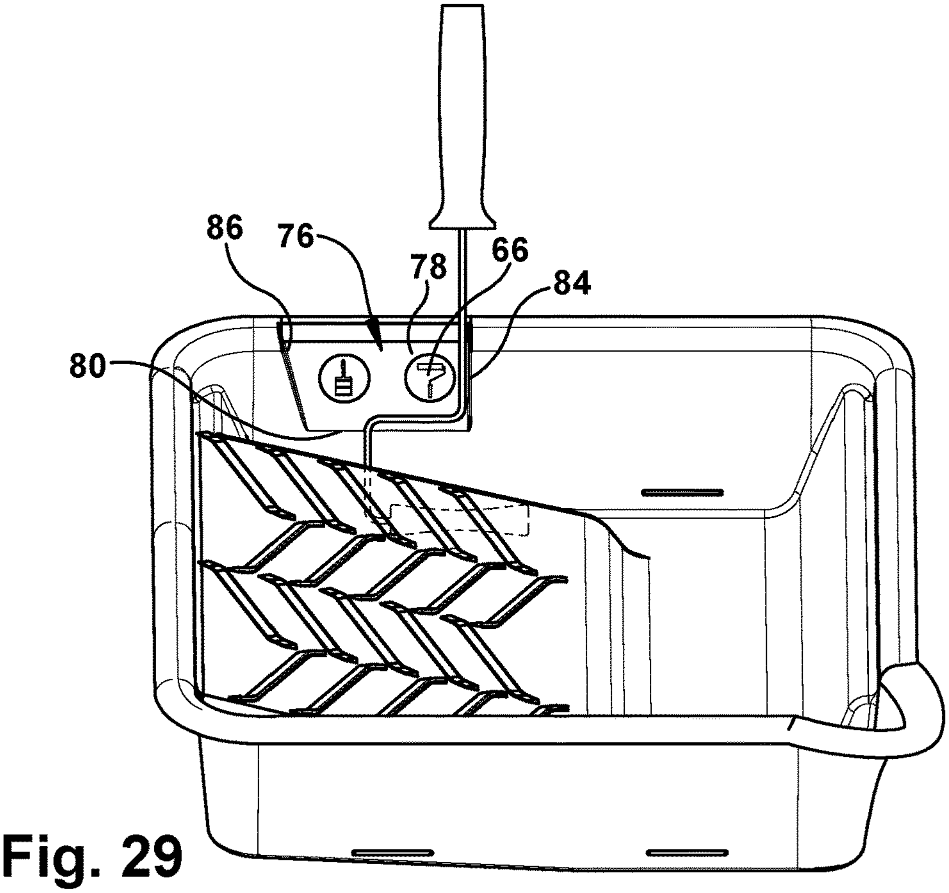
FIG. 29 is a right side perspective view like that of FIG. 28, but with a small roller installed in a tool receptacle notch on the left side of the paint tray.

One edge 84 of the notch 78 is a vertical wall that is substantially perpendicular to the bottom surface of the paint tray 22. The opposite edge 86 of the notch 78 is angled relative to the opposite vertical wall 84. The opposite edge 86 is angled away from the vertical wall 84 such that the trapezoidal shape of the tool receptacle 76 is narrower at the bottom edge 80 and wider at the top edge of the notch 78. The notched-out side wall on the North American paint tray 22 is for paint brush & mini roller cover temporary storage while painting. The angled edge 86 of the notch 78 is for storing a paint brush that has an angled brush end, as shown in FIG. 28. The vertical edge 84 of the notch 78 is for storing a paint brush that has a flat lower edge of the brush or a mini-paint roller handle, as shown in FIG. 29.

The angled edge 86 of the notch 78 is at an angle of approximately 15 degrees, which accommodates angled brushes. The vertical edge 84 is 90 degrees to accommodate flat brushes and mini-roller frame wires.

While the tool receptacle 76 is shown and described as having an angled wall and a vertical wall, the tool receptacle 76 walls could have other shapes, such as two vertical walls, two angled walls, or another shape altogether. For example, the tool receptacle 76 could have individual recesses for holding the tools therein or for gripping the tools, if desired. The tool receptacle 76 could be absent, if desired.

The tool receptacle 76 also includes indicia or icons 66 to signal to the user what the tool receptacle 76 can be used for. For example, the tool receptacle 76 can have molded in nomenclature or images to indicate that the receptacle 76 is for use with brushes and/or mini-rollers. A sticker could alternatively be used, or some other type of signaling matter. The molded in nomenclature or images 66 are well suited for the application since the paint tray is subjected to washing on a frequent basis and stickers might be prone to wear off.

Because the left front and rear corners of the North American paint tray 22 seat at a generally centrally positioned location on the underlying paint bucket 5, its necessary for the upper lip 24 of the paint tray 22 to fit over the upper edge 9 of the paint bucket 5. The North American paint tray 22 includes two cut-throughs 88 on the upper lip 24 at each corner that permit the paint tray 22 to seat over the upper edge 9 of the bucket 5 and to sit flat on the upper edge 9 of the bucket 5. The cut-throughs 88 are formed as generally rectangular or curvilinear notches that are cut from the lower edge of the upper lip 24 of the paint tray 22.

While the North American paint tray 22 is shown as having a spout shape 46 on the right, rear corner of the paint tray 22, if desired, the North American paint tray 22 could have a uniform shape on the left and right sides so that the North American paint tray 22 does not fit in the spout 46. For this embodiment, which is not shown, the North American paint tray 22 could sit at any position along the length L of the paint bucket 5, but the paint bucket 5 would remain open on either side of the paint tray 22. In this embodiment, cut-throughs 88 would be required on all four corners of the paint tray 22 and the rear wall 60 of the paint tray 22 could extend from side to side 60, 64 of the paint tray 22 since the spout 46 would not be present. Also, in this alternative embodiment, a tool receptacle 76 could be formed on both sides of the paint tray 22.

FIGS. 16, 17, 23, and 24 depict a gripping portion 90 of the paint tray 20, 22. The gripping portion 90 is a tactical surface that the user can feel when attempting to pick up the paint tray 20, 22. The gripping portion 90 is formed from a lower edge of the upper lip 24. The gripping portion 90 represents a center of gravity of the paint tray 20, 22 and is designed to alert the user where they should grasp the paint tray 20, 22 to avoid spilling the paint in the tray. As is evident, the gripping portion 90 is not located directly in the center of respective side walls 60, 64 of the tray 20, 22. The gripping portion 90 shown is a scalloped semi-circular indentation on the lower surface of the lip 24 of the trays 20, 22 that provides grips on each side that direct users to lift the trays 20, 22 central to the paint load. Other shapes could alternatively be used.

Figure 25:
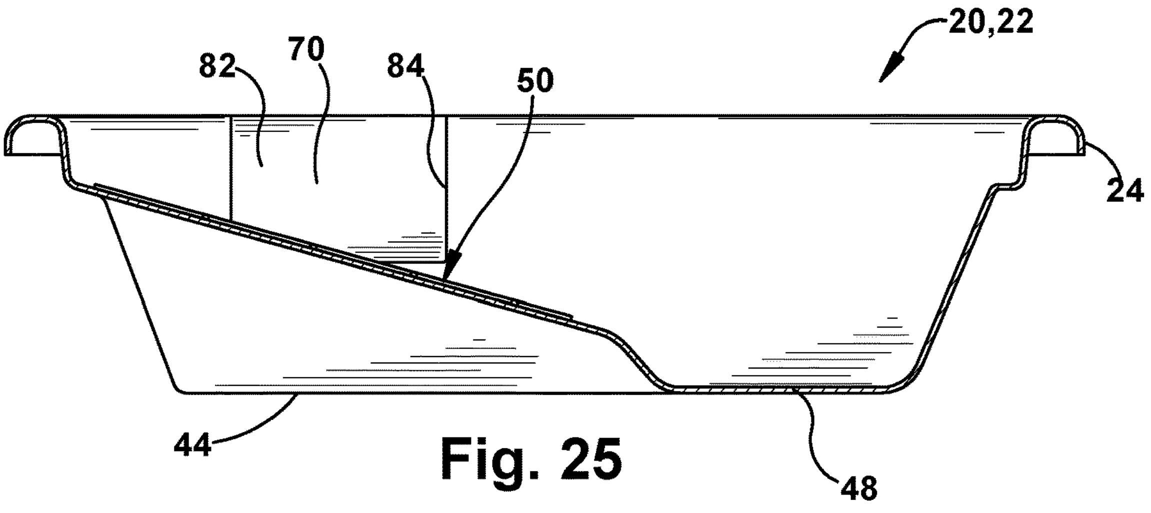
FIG. 25 is a cross-sectional view of the paint tray of FIG. 18.

FIG. 25 is a cross-sectional view of the paint tray 20, 22 showing the various angles of the surfaces. The roll off surface 50 is at an angle of 15 degrees relative to the bottom surface 44 of the paint tray 20, 22. At the lower end of the roll off surface 50, the slope of the surface changes to be steeper until the roll off surface ramp 50 meets the bottom surface 44 of the paint tray 20, 22. This steeper surface of the roll off ramp 50 permits the receptacle or paint well 48 to be formed at the bottom of the paint tray 20, 22 for storing paint. As previously mentioned, the paint receptacle 48 is formed between the roll off ramp 50 and the rear wall 54 of the tray 20, 22. The roll off ramp 50 is approximately 8" long, but could be another length. In addition, the angle of the roll off ramp 50 could be different. The rear wall 54 of the tray 20, 22 is angled at 20 degrees relative to vertical.

This permits paint to flow into the paint well 48 in the bottom 44 of the paint tray 20, 22 and also permit the paint tray 20, 22 to nest inside the paint bucket 5. FIG. 25 shows the tool receptacle 76 as having two vertical walls instead of an angled wall and a vertical wall.

FIGS. 26 and 27 are cross-sectional views of the paint tray 20, 22 showing the nesting ribs 70 and sloped surface 92 of the inner side of the feet in the side recesses 62. For both trays 20, 22, an upper surface of the side recesses 62 on both sides of the roll off ramp 50 are sloped towards the paint reservoir/well 48, ensuring that any paint in these areas flows down towards the paint reservoir/well 48. The sloped surfaces 92 are raised relative to a bottom edge of the feet 38. A rib 74 may be formed under the sloped surfaces 92 to provide a flat bottom for the feet 38, or the plastic in this area may be made thicker. When a rib 74 is used, the feet 38 retain a raised edge around the sloped surfaces 92 so that a bottom surface of the feet is flat and permits the feet to seat properly on a flat surface. The sloped surface 92 above the feet 38 facilitate maximum paint usage as well as easier clean up.

The nesting ribs 70 were discussed above in greater detail in connection with FIGS. 11-17.

Figure 30:
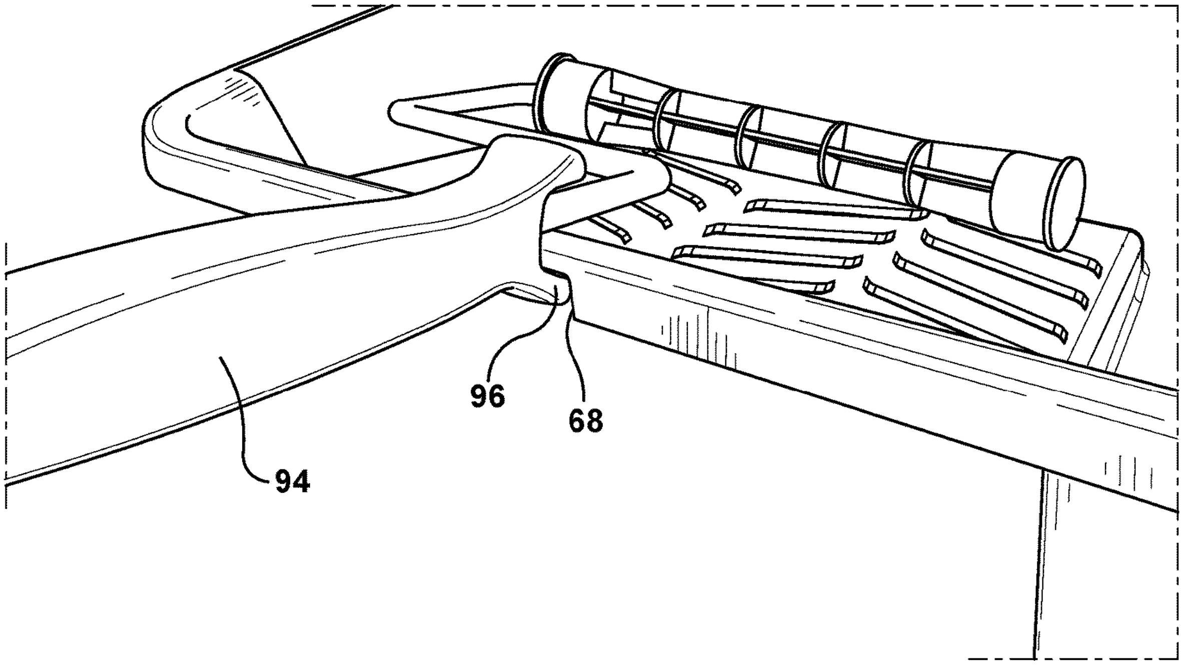
FIG. 30 is a front perspective view of the paint tray of FIG. 18, showing a roller handle resting on the paint tray.

FIG. 30 depicts a roller handle 94 installed in the notch 68 that is formed on the front edge of upper lip 24 of the paint tray 20, 22. The notch 68 opens downwardly and is substantially rectangular in shape. The notch 68 is configured to mate with a lower nob 96 that extends from the paint roller handle 94 so that the paint roller handle 94 can be held on the paint tray 20, 22 in a relatively stable position.

Figure 31:
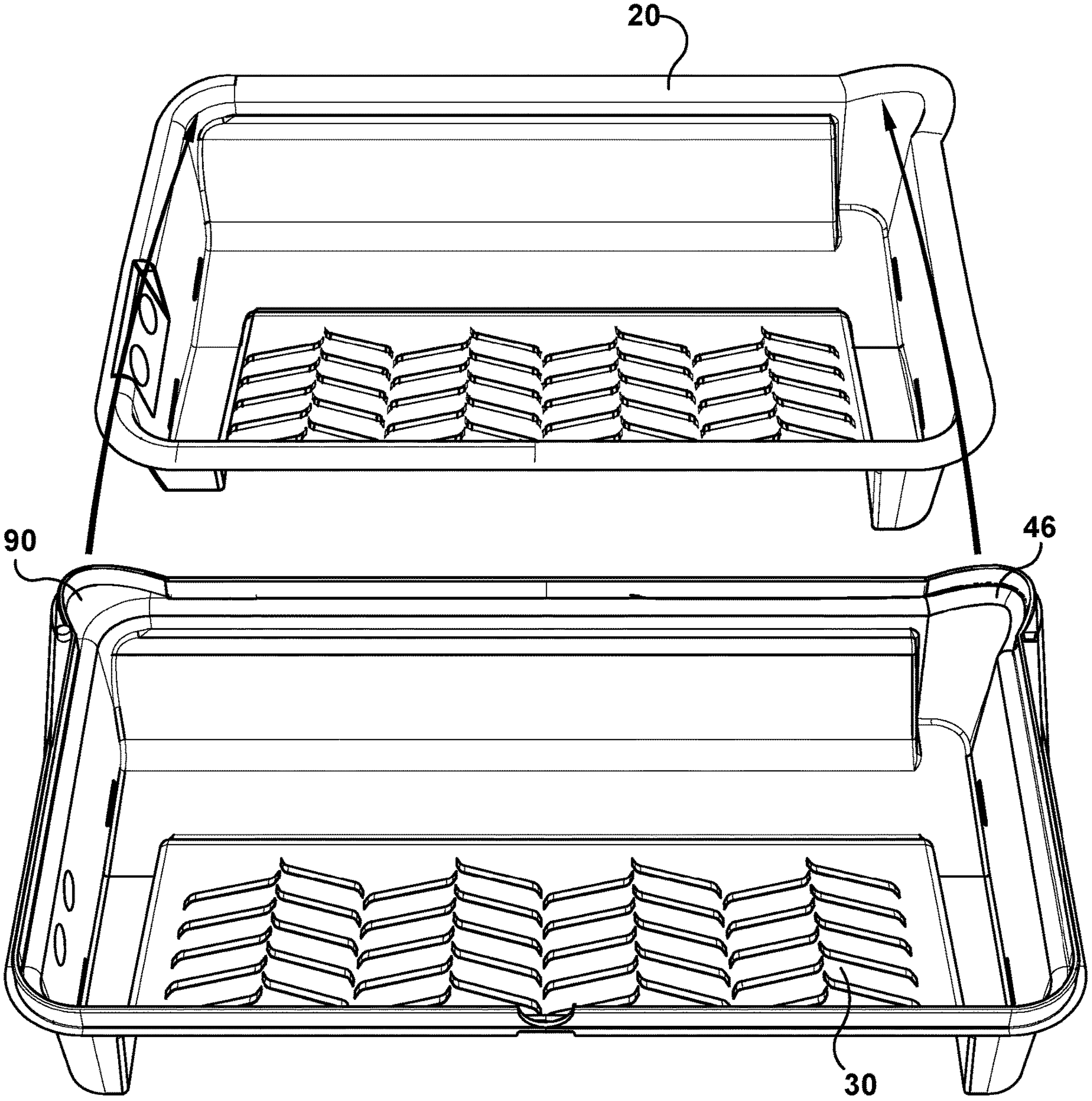
FIG. 31 is an exploded top view of a paint tray liner and the paint tray of FIG. 11.
Figure 32:
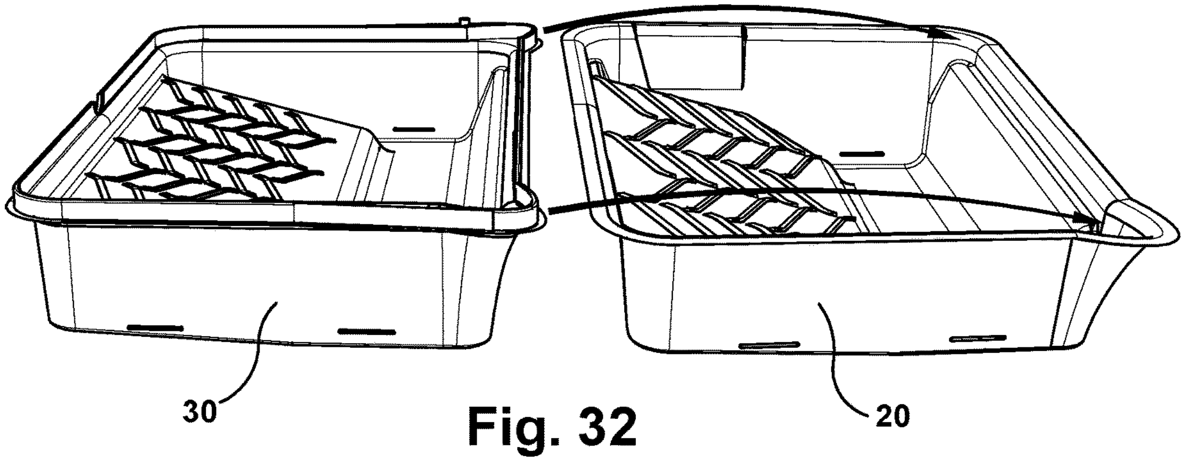
FIG. 32 is an exploded side perspective view of the paint tray liner and paint tray of FIG. 31.

FIGS. 31-32 depict an exploded view of an 18" paint tray 20 and 18" paint tray liner 30 that seats in the paint tray 20. Because the liner 30 seats in and over the paint tray, it is slightly larger than the dimensions of the paint tray 20. The 18" paint tray liner 30 has substantially the same shape as the paint tray 20, except it has an extra ear 98 on the left side wall at the rear corner. As will be explained in greater detail below, this ear 98 is used to cover the spout 46 when paint tray liners 30, 32 are positioned on top of one another.

Figure 33:
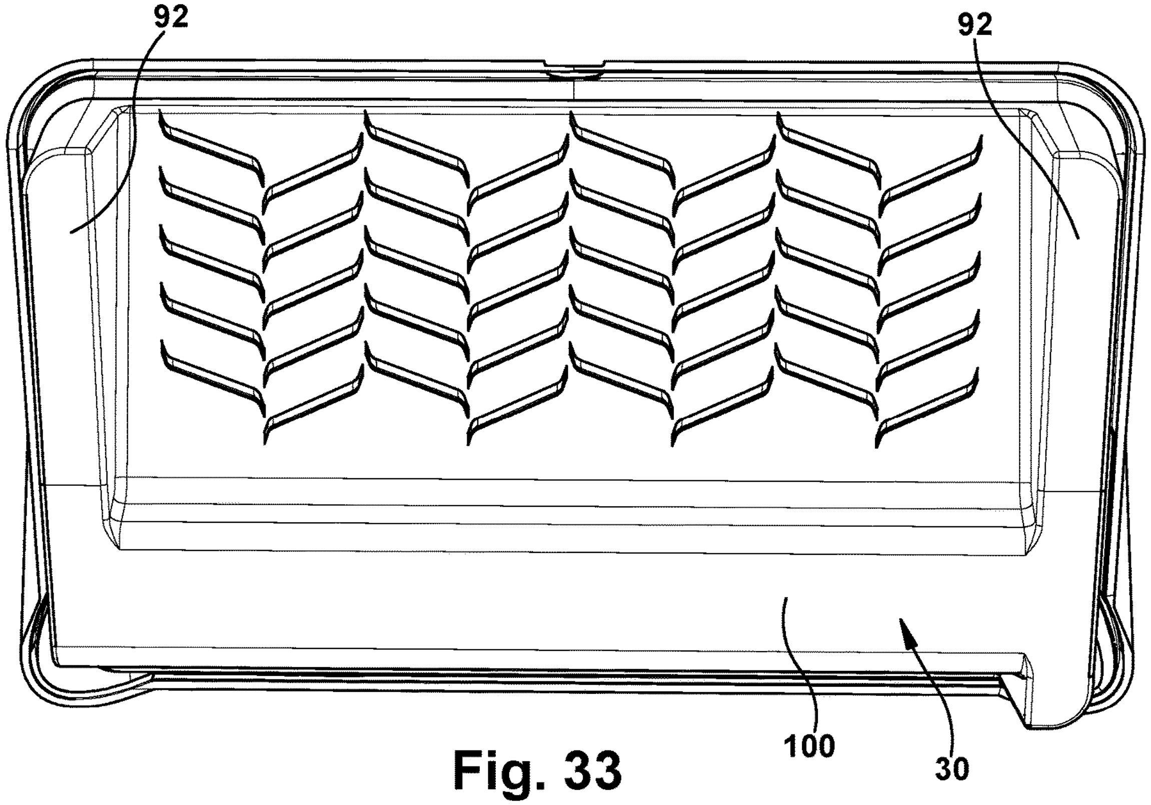
FIG. 33 is a bottom view of the paint tray liner of FIG. 31.
Figure 34:
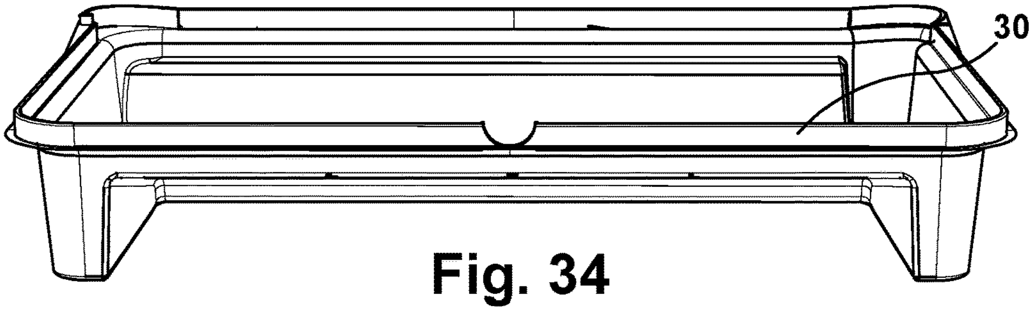
FIG. 34 is a front view of the paint tray liner of FIG. 31.
Figure 35:
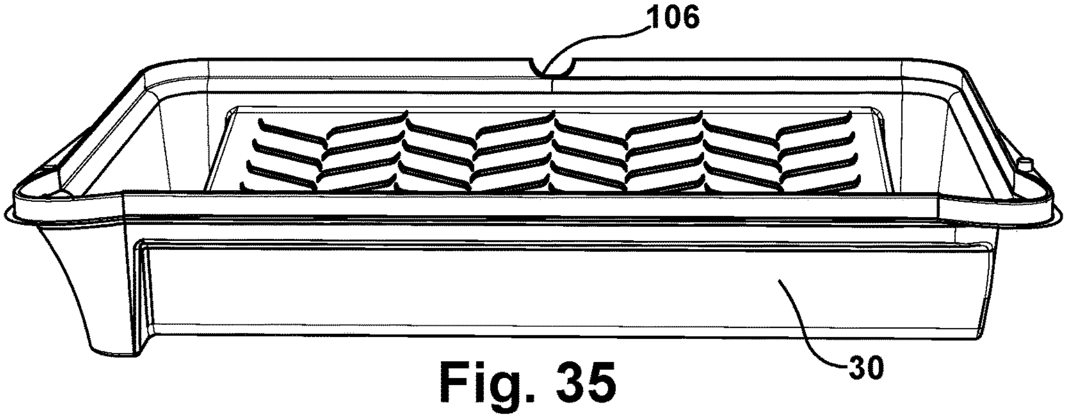
FIG. 35 is a rear view of the paint tray liner of FIG. 31.
Figure 36:
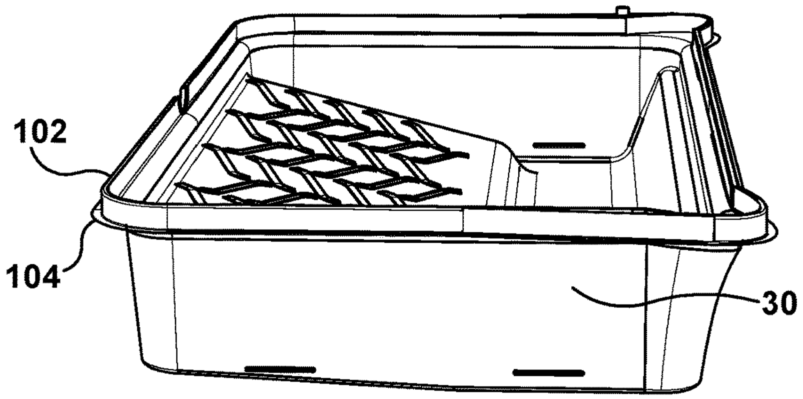
FIG. 36 is a right side view of the paint tray liner of FIG. 31.
Figure 37:
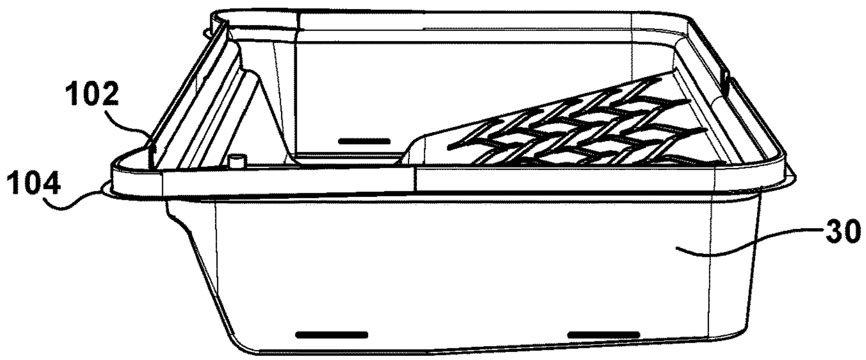
FIG. 37 is a left side view of the paint tray liner of FIG. 31.
Figure 38:
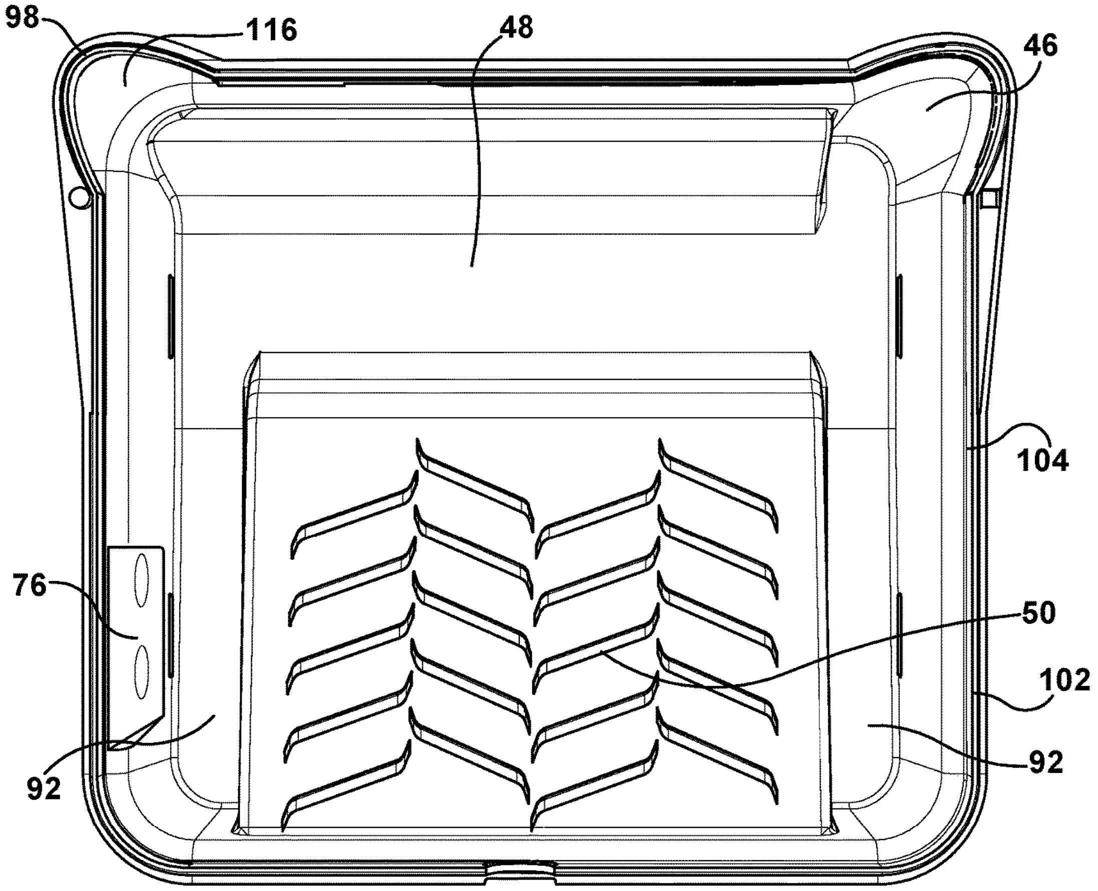
FIG. 38 is a top view of an alternative paint tray liner for use with the paint tray of FIG. 18.
Figure 39:
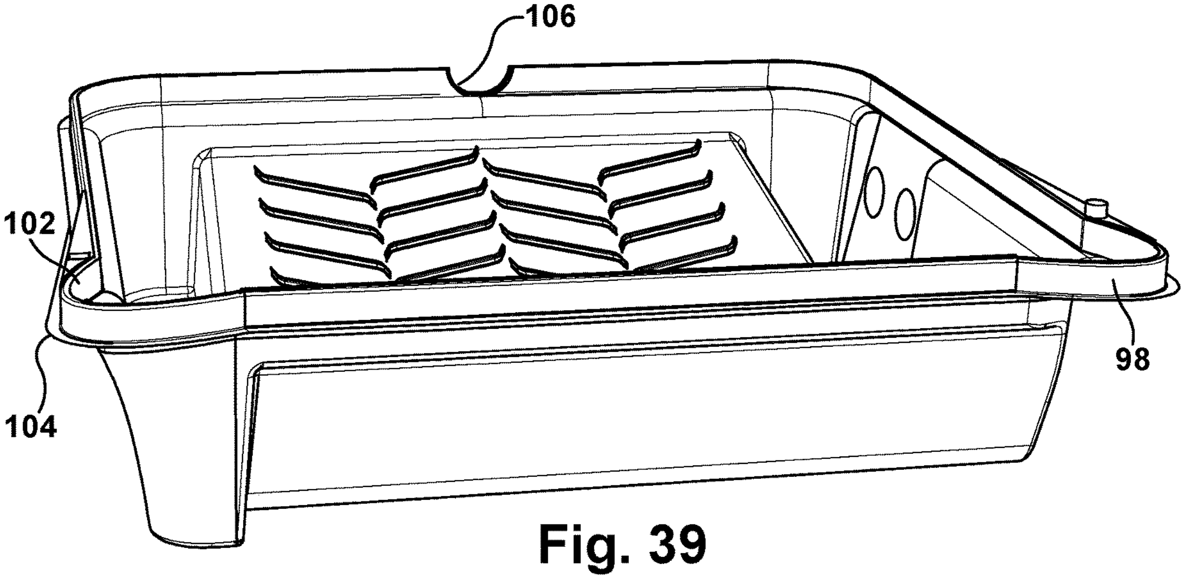
FIG. 39 is a rear view of the paint tray liner of FIG. 38.
Figure 40:
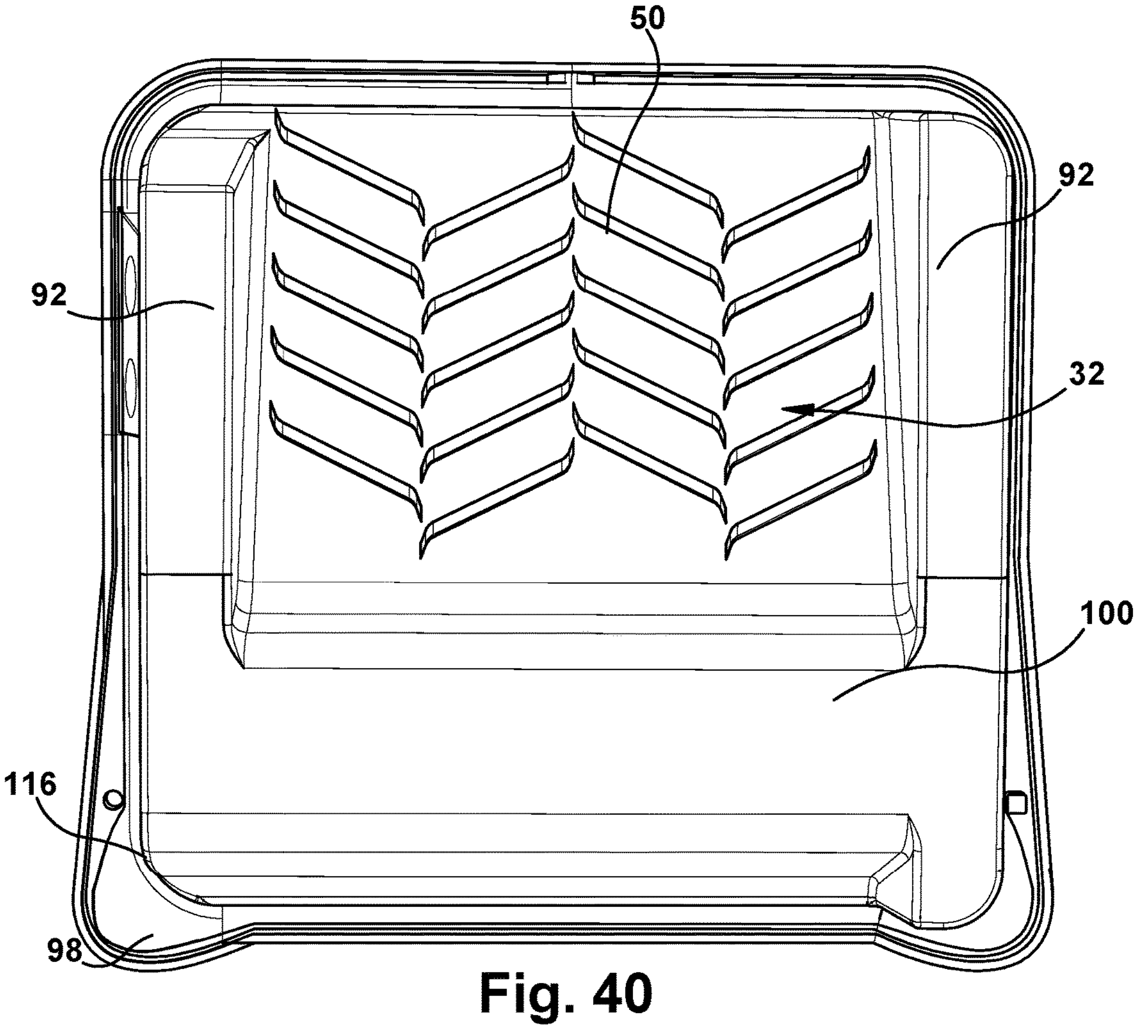
FIG. 40 is a bottom view of the paint tray liner of FIG. 38.
Figure 41:
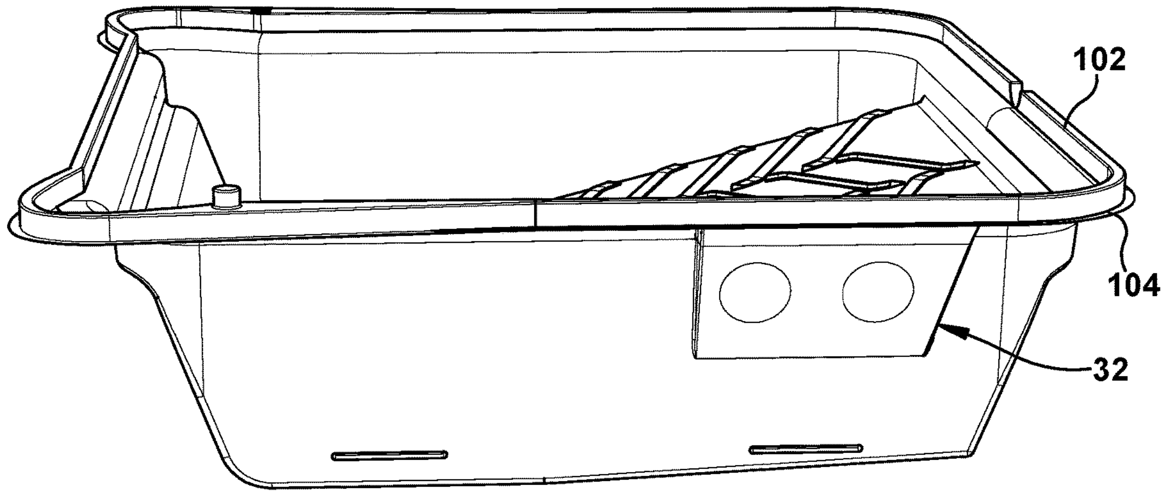
FIG. 41 is a left side view of the paint tray liner of FIG. 38.
Figure 42:
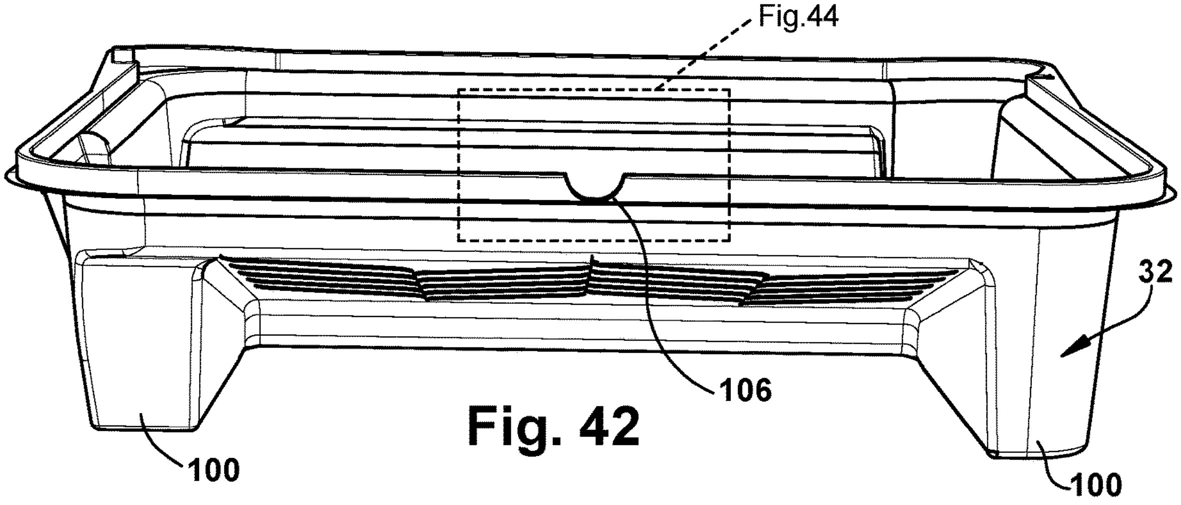
FIG. 42 is a front view of the paint tray liner of FIG. 38.
Figure 43:
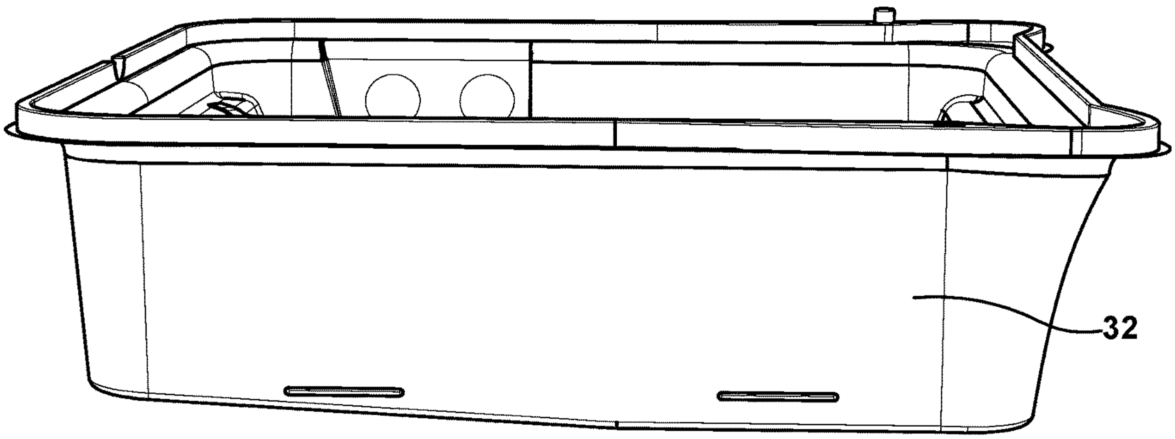
FIG. 43 is a right side view of the paint tray liner of FIG. 38.

FIG. 33 depicts a bottom surface 100 of the paint tray liner 30. Because the inner bottom surface of the paint tray 20 is slightly sloped along the side walls in the area of the feet 38, the liner 30 incorporates the slope in this area so that the paint tray feet 38 of the liner 30 are not in the same plane as the paint well lower surface 48.

FIGS. 34-37 depict various views of the paint tray liner 30 for the 18" paint tray 20. The paint tray liner 30 has an upper rim 102 that is raised relative to the outer edge 104 of the liner 30. This rim 102 is a like a rib that extends upwardly. The rib 102 includes a semi-circular recess 106 that is centrally located on the front wall of the liner 30. This circular recess is used to hold a handle 94 of a roller.

Figure 44:
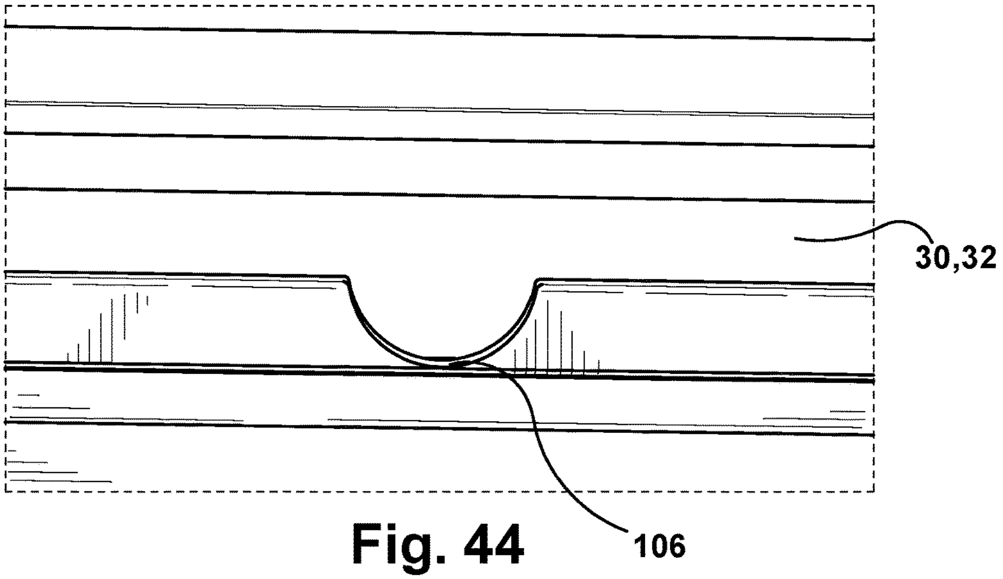
FIG. 44 is an enlarged view of the circular notch of the paint tray liners of FIGS. 31 and 38.

FIGS. 38-43 depict a paint tray liner 32 for the North American paint tray 22. The paint tray liner of FIGS. 38-43 is similar to the paint tray liner 30 for the 18" paint tray 20. The only difference is that the North American paint tray liner 32 includes a notch 108 on the left side wall to mate with the tool receptacle 76 of the underlying paint tray 22. In addition, the North American paint tray liner has an upwardly extending rib 102 that surrounds the upper edge of the paint tray liner 32 and a semi-circular recess 106 is formed in the front wall of the rib 102. FIG. 44 depicts a close up view of the semi-circular recess 106 formed in the front wall rib 102.

Figure 45:
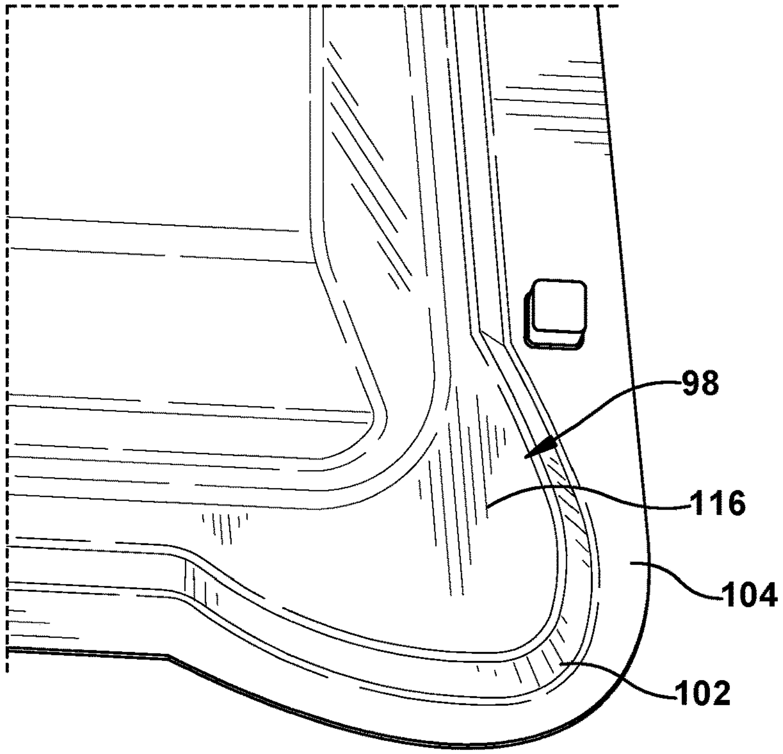
FIG. 45 is a top view of a left, rear corner of the paint tray liners of FIGS. 31 and 38.

FIG. 45 depicts the ear 98 of the paint tray liner 30, 32 that is formed in the rear, left corner of the paint tray liner 30, 32. This ear 98 has a shape that is substantially the same as the pour spout 46, but the ear 98 has a closed surface, like a table, so that it doesn't extend downwardly in the corner to a spout 46. The reason for this is that the left side of the paint tray 20, 22 does not have a spout 46, so the part of the tray liner 30, 32 that is positioned below the ear 98 must fit inside the paint tray 20, 22.

Figure 46:
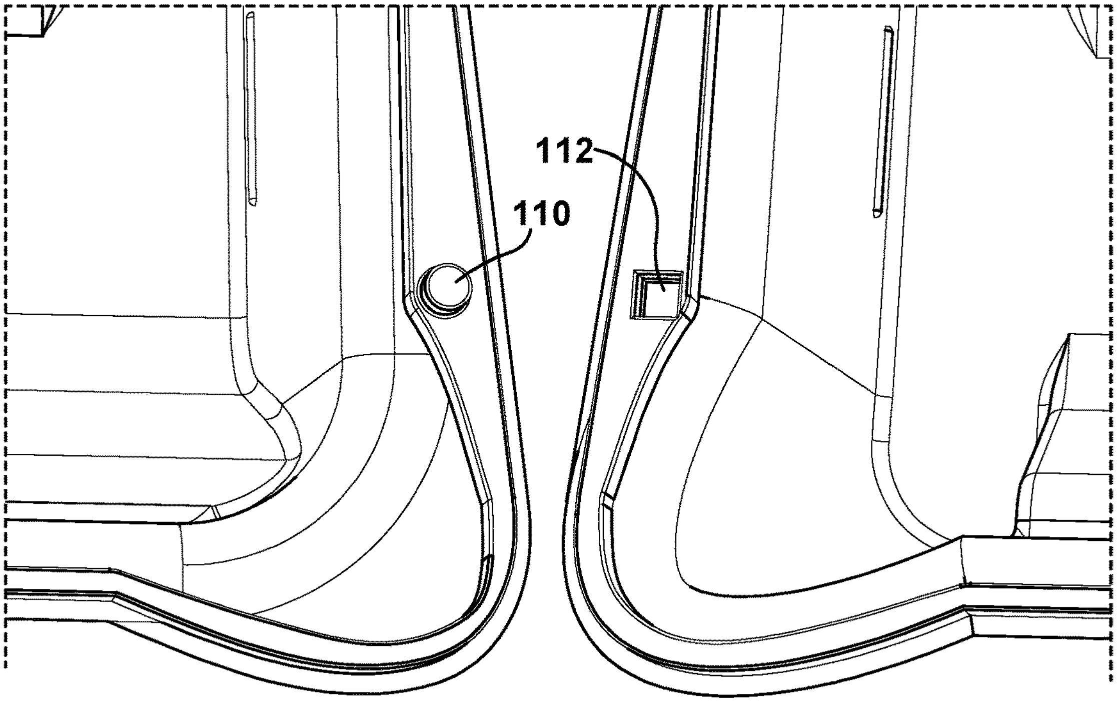
FIG. 46 is a side-by-side perspective view of the left rear corner of a paint tray liner, like that in FIG. 45, and a right, rear pouring spout of another like paint tray liner.
Figure 47:
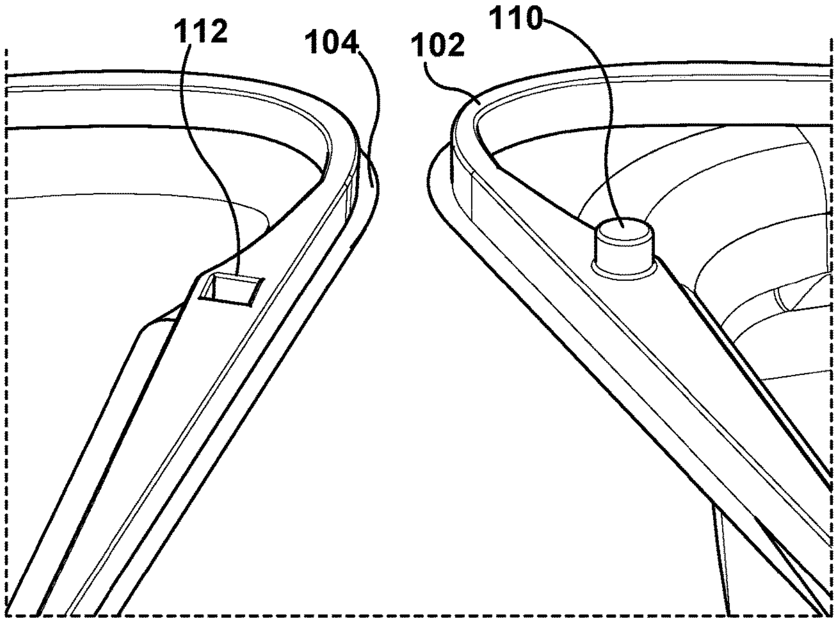
FIG. 47 is a perspective view like that in FIG. 46, but from an opposite direction.

FIGS. 46-47 depict a post 110 and pocket 112 that are formed on the outer rim 120 of the paint tray liners 30, 32. These posts 110 and pockets 112 are also referred to as "round boss" and "square hole". The intent of these features is to permit the paint tray liners 30, 32 to be coupled together by forcing the round boss 110 into the square hole 112. This occurs when a second paint tray liner is flipped upside down and positioned on top of a first paint tray liner that is positioned in a paint tray 20, 22. The round boss 110 and square hole 112 features may be placed at different locations around the periphery of the liners 30, 32, or could be positioned at only a few locations. For example, in one embodiment, the posts 110 and pockets 112 are formed on opposite sides 60, 64 of the tray liner 30, 32 adjacent the pour spout 46 and ear 98.

Figure 48:
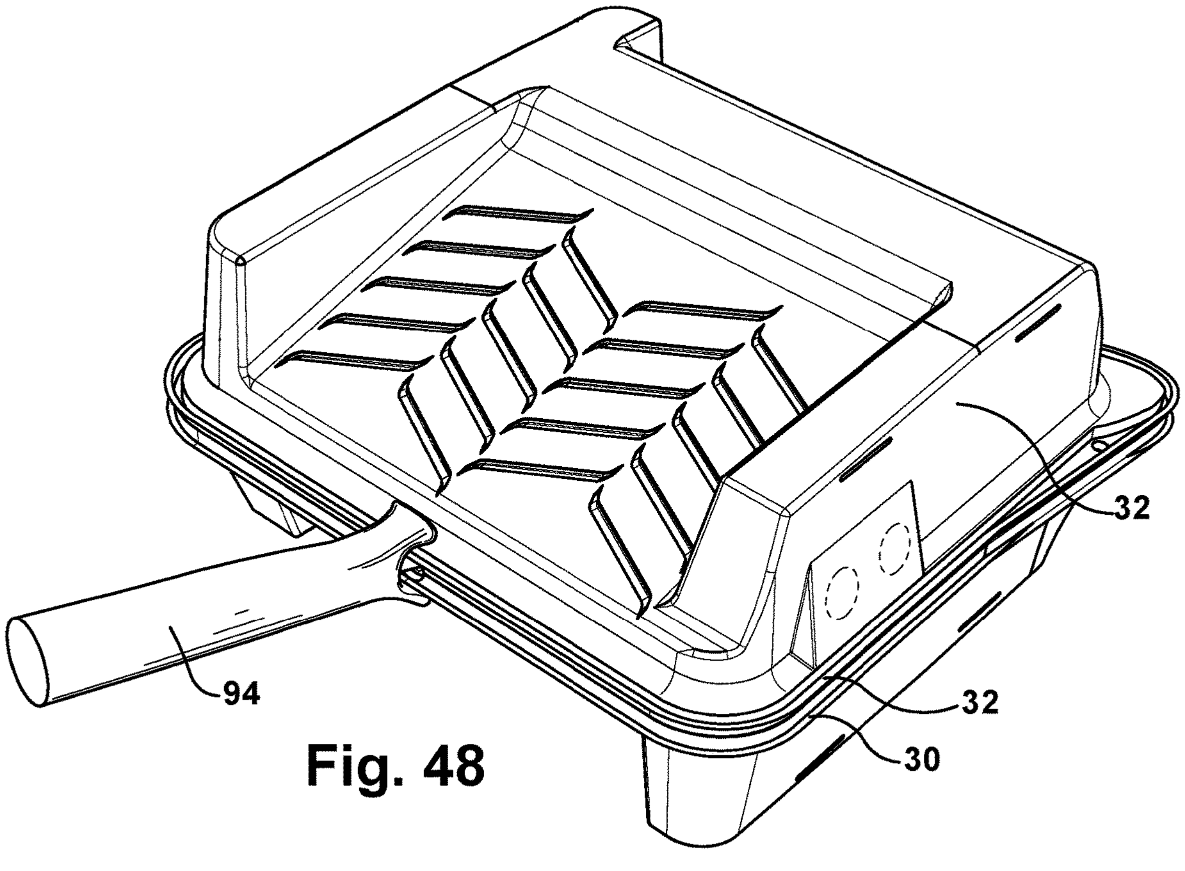
FIG. 48 is a perspective view of a top paint tray liner serving as a lid for a bottom paint tray liner, and with a roller stored between the top and bottom paint tray liners.
Figure 49:
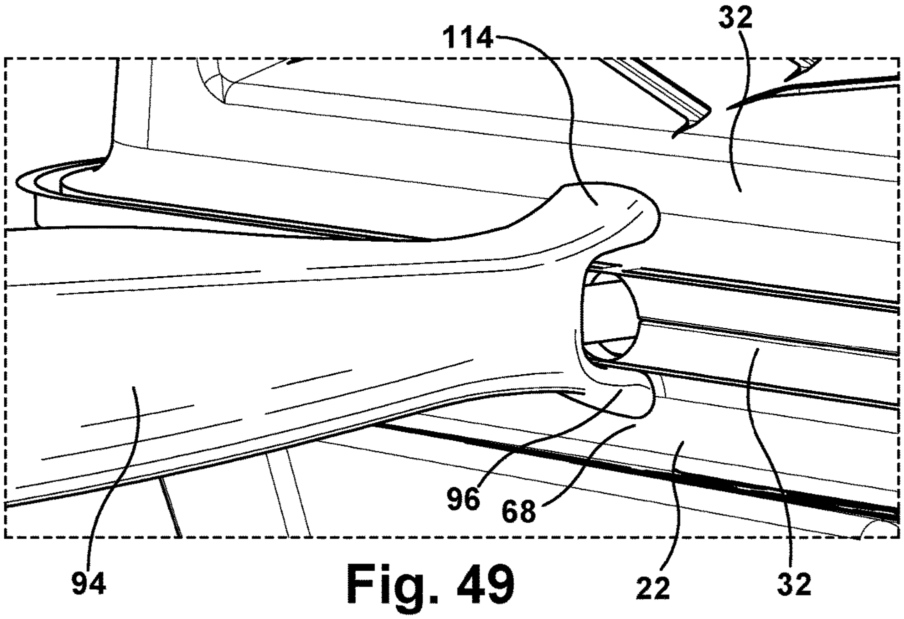
FIG. 49 is an enlarged perspective view of the paint roller handle engaged with the paint tray liners and a paint tray.

FIGS. 48-51 depict a second tray liner 32 positioned upside down on top of a first tray liner 32. FIGS. 48 and 49 depict the first tray liner 32 positioned in a paint tray 22. The second tray liner 32 serves as a lid for the first tray liner 32 and the first and second tray liners 32 can be coupled together by engaging the posts 110 and pockets 112. The ribs 102 on the upper surfaces of the liners 32 engage one another and seat against each other. The second tray liner 32 serves as a temporary lid and is intended for shorter periods of storage, such as during a work break. The connection between the liners 32 is not air tight and, as such, is not recommended for overnight storage. However, the temporary lid can be used to deter paint drying or skimming over shorter periods of time. It can also be used to prevent a roller or brush from drying out during storage.

FIGS. 48 and 49 depict a roller 26 positioned inside the first tray liner 32 and the handle 94 of the roller 26 extends outwardly from the paint tray liner 32. FIG. 49 depicts the connection that is formed between the roller handle 94 and the paint tray 22 and liners 32. As with FIG. 30, the roller handle 94 has a lower knob 96 that couples with the notch 68 on the front edge of the lip 24 of the paint tray 32. The roller handle 94 has an upper knob 114 that surrounds the outer edge 104 of the second liner 32. The engagement between the roller handle 94 and the system 10 that incorporates the two liners 32 and the paint tray 22 helps to further ensure a connection between the paint tray liners 32 and the paint tray 22 so that the roller 26 is not permitted to slip into the paint well 48.

Figure 51:
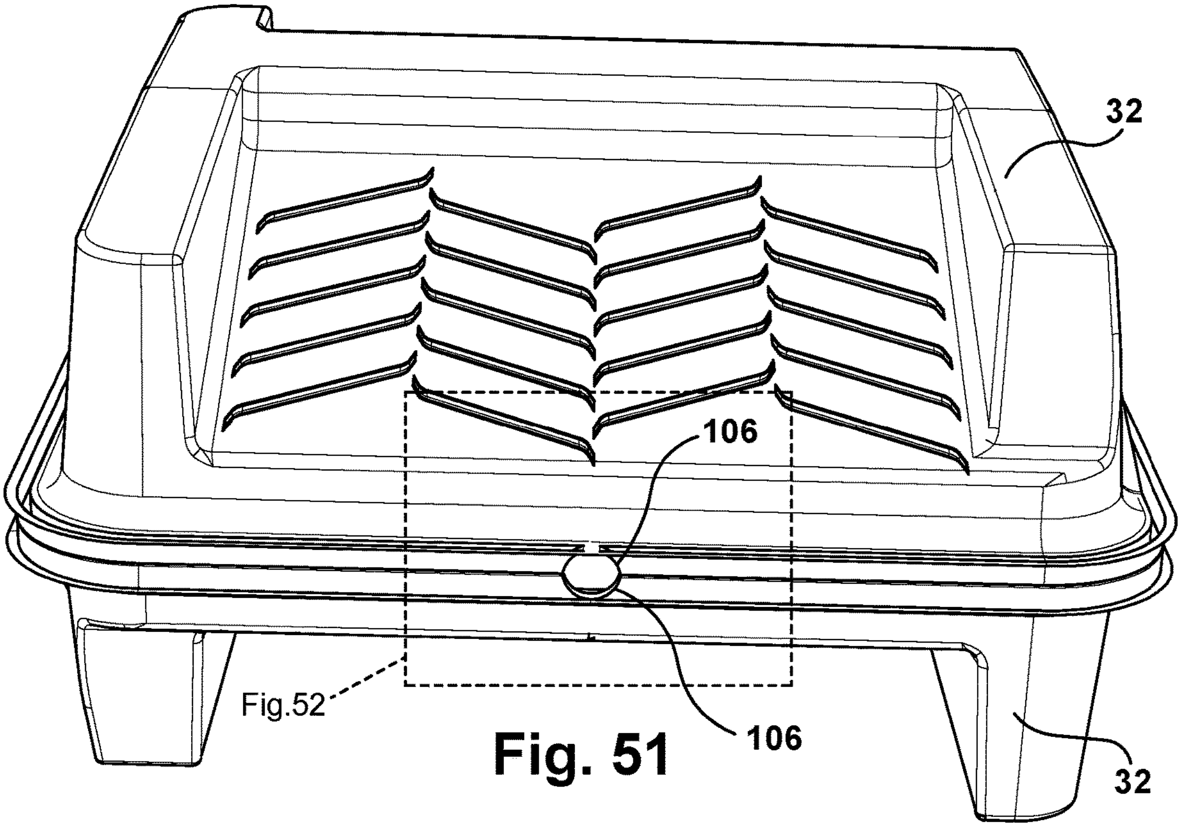
FIG. 51 is a front perspective view of the paint tray liners of FIG. 48.
Figure 52:
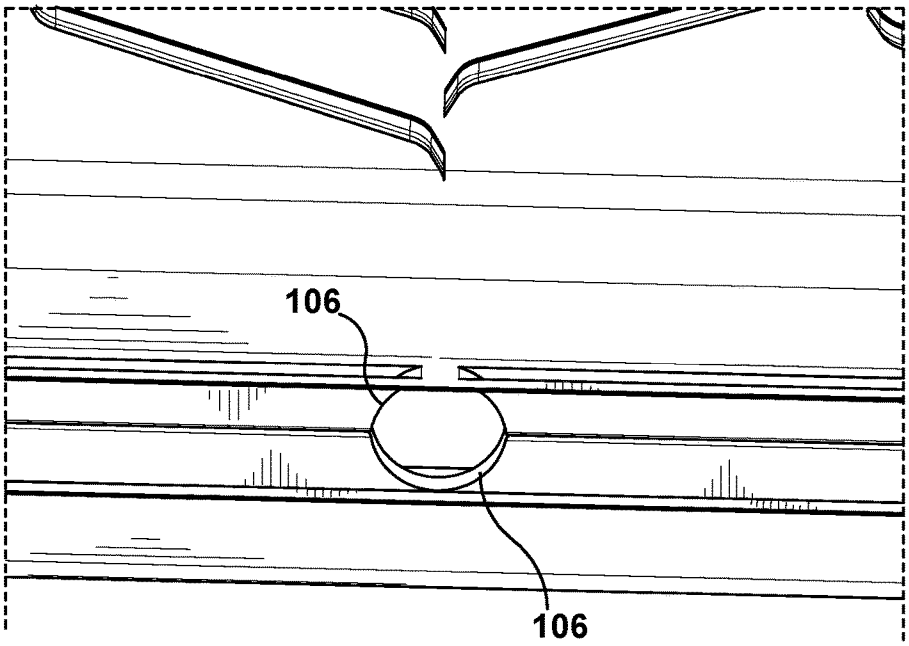
FIG. 52 is an enlarged front perspective view of semi-circular notches formed in the front edges of the paint tray liners of FIG. 48.

FIGS. 51 and 52 show how a circular opening is formed between the second and first tray liners 32 when the liners 32 are installed on top of one another. This opening permits the handle 94 of a roller 26 to extend through the opening during temporary storage. This opening could be other shapes, if desired. The semi-circular notch 106 in the liners 32 is to accommodate the roller frame handle wire when a second liner is used as a temporary lid, while the rectangular notch 68 in the tray 22 is for the "bucket rest" portion (or knob 96) of the roller frame handle 94 to prevent the roller cover & frame from being submerged in the paint well 48 when not in use or in transit. In addition, the semi-circular notch 106 on the 18" tray liner 30 is larger to accommodate larger wire frames for rollers.

Figure 50:
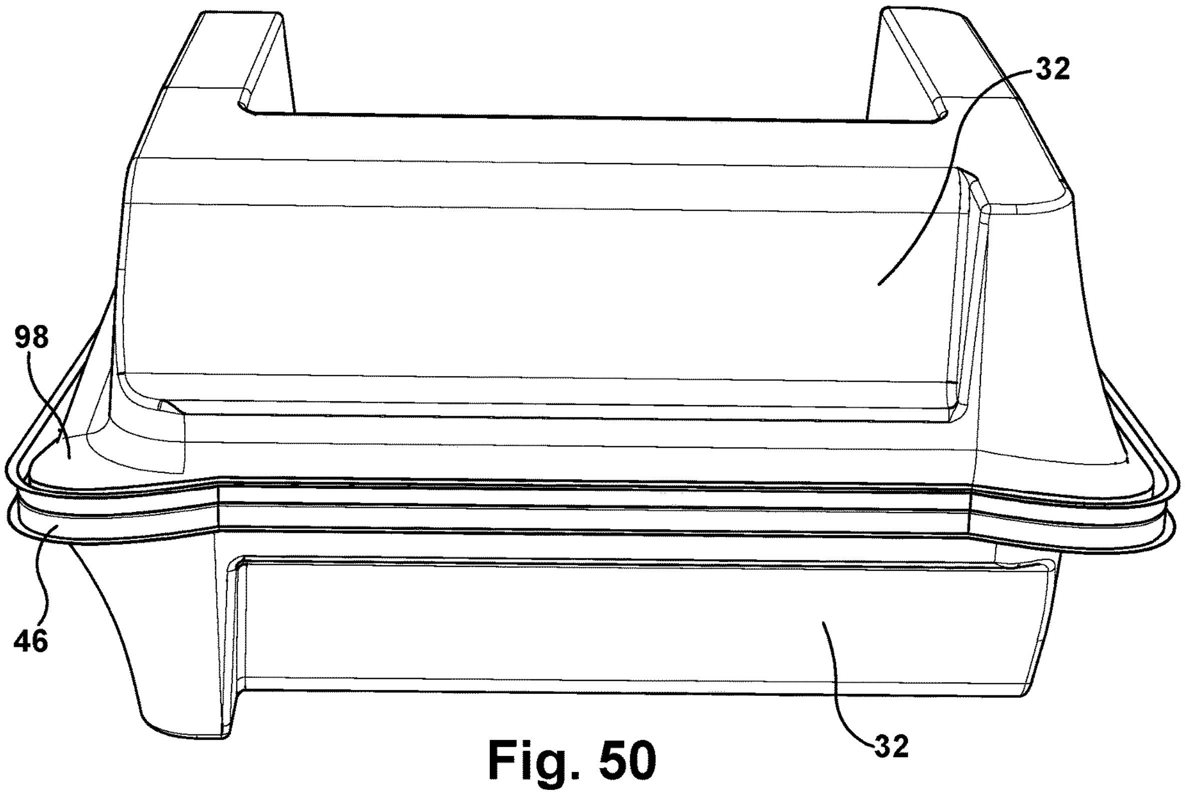
FIG. 50 is a rear perspective view of the paint tray liners of FIG. 48.
Figure 53:
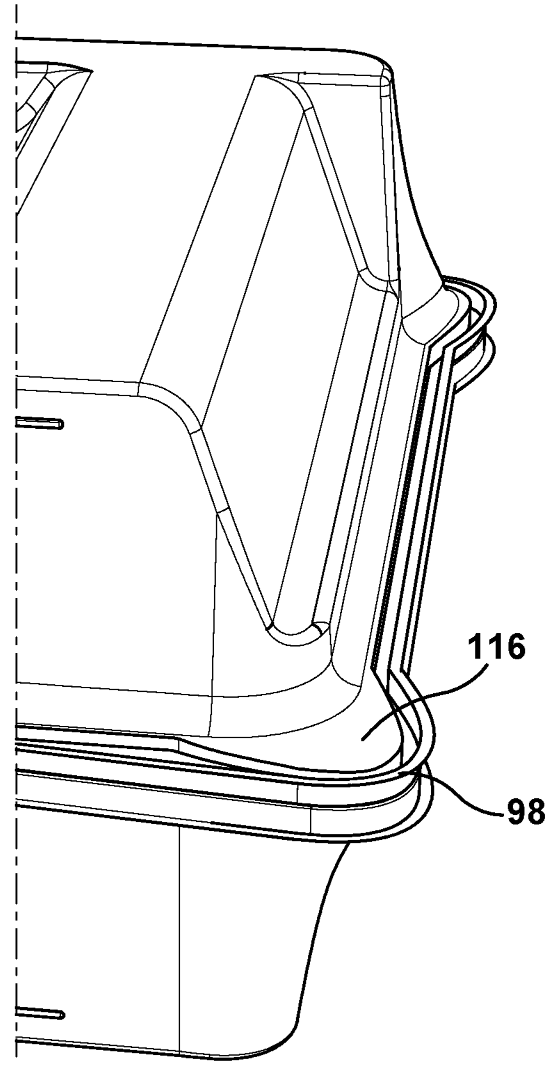
FIG. 53 is right, rear corner, perspective view of the paint tray liners of FIG. 48 showing the spout of the bottom paint tray liner being covered by the upper paint tray liner.

FIGS. 50 and 53 depict how the ear 98 of the second tray liner 30, 32 overlaps the spout 46 of the first tray liner 30, 32 and vice versa. FIG. 53 shows the ear 98 of the second tray liner 30, 32 on top of the pour spout 48 of the first tray liner 30, 32. The ear 98 has a flat surface 116 that serves to close off the spout 46 during temporary storage.

The paint bucket 5 may have a width W of approximately 15", a length L of approximately 25", a depth D of approximately 10", and a height H of approximately 11". The 18" paint tray 20 has a length that is approximately 26", a width that is approximately 15.5", a depth that is approximately 4", and a height that is approximately 4.2". The North American paint tray 22 has a length L2 of about 16.5", a width of about 15.5", a depth of about 4", and a height of about 4.2".

While not shown, the paint tray 20, 22 could have a length that extends along the entire length of the paint bucket 5 and a width that is less than the width of the paint bucket 5 to permit the user to use a roller from the paint bucket 5 and a paint brush or mini-roller from the paint tray. Other sizes may alternatively be used. The examples described herein for the paint trays are substantially the same, other than the 18" tray 20 is longer than the North American paint tray 22. However, as discussed above, the North American paint tray 22 could have a different shape so that the North American paint tray 22 does not engage the sides of the paint bucket 5 and, instead, seats in a central location of the opening of the paint bucket 5, with the North American paint tray 22 extending between the front and rear walls of the paint bucket 5.

In one embodiment, a nesting paint bucket 5 and tray 20, 22 system 10 includes a paint bucket 5 and a paint tray 20, 22. The paint bucket 5 has an open upper end with an upper edge 9 defined around the open upper end and a well/receptacle for holding paint. The paint tray 20, 22 has a depth that is less than the depth of the paint bucket 5. The paint tray 20, 22 has an upper edge that is shaped and sized to seat on the upper edge 9 of the paint bucket 5 to permit the paint tray 20, 22 to nest inside the open upper end of the paint bucket 5. The connection between the paint tray upper edge 9 and the upper edge 9 of the paint bucket 5 is sufficient to hold the weight of the paint tray 20, 22 plus paint load on top of the paint bucket 5. The paint tray 20, 22 provides an elevated work surface relative to a paint level in the paint bucket 5.

The system 10 may have a paint tray 20, 22 that has a size and shape that is substantially the same as the entire size and shape of the upper end of the paint bucket 5. In this example, the paint tray 20, 22 provides a lid to seal the paint bucket 5 for at least overnight storage. The system 10 may have a paint tray 20, 22 that has a size and shape that is less than the shape of the open upper end of the paint bucket 5 such that part of the upper end of the paint bucket 5 remains open when the paint tray 20, 22 is installed on the paint bucket 5. The paint tray 20, 22 of the system 10 may have a width that is substantially the same as the width of the paint bucket 5, but a length that is less than the length of the paint bucket 5.

The system 10 may also include a paint tray liner 30, 32 having a shape and size to nest inside the paint tray 20, 22. The system may also include a second paint tray liner 30, 32. The second paint tray liner 30, 32 may be shaped and sized such that when the second paint tray liner 30, 32 is positioned upside down on top of the first paint tray liner 30, 32, the second paint tray liner 30, 32 serves as a lid for the first paint tray liner 30, 32 to permit temporary storage of any paint positioned in the first paint tray liner 30, 32.

The paint tray 20, 22 may have a length that is less than the length of the paint bucket 5. The paint tray 20, 22 has an upper lip 24 that is sized and shaped to seat on the upper edge 9 of the paint bucket 5. The paint tray 20, 22 has at least two downwardly facing cut throughs 88 on the upper lip 24 to accommodate the upper edge 9 of the paint bucket 5 within the upper lip 24 of the paint tray 20, 22 at an intermediate portion of the length of the paint bucket 5.

The paint bucket 5 has a pour spout 40 positioned at one corner of the bucket 5. The paint tray 20, 22 is configured to mate with the shape of the pour spout 40 such that the paint tray 20, 22 seats at least along the side of the paint bucket 5 that has the pour spout 40.

The paint tray liners 30, 32 include nesting posts 110 and pockets 112 for mating the first and second paint tray liners 30, 32 together when one is installed on top of the other. The nesting posts 110 and pocket 112 may be round boss and square hole.

The paint tray 20, 22 may have a pour spout 46 in one corner thereof. The paint tray liner 30, 32 may have a corner shape that permits the paint tray liner 30, 32 to nest in the pour spout 46 of the paint tray 20, 22. The paint tray liner 30, 32 has an adjacent corner ear 98 shape that permits the paint tray liner 30, 32 to cover the pour spout of the first paint tray liner 30, 32 when the second paint tray liner 30, 32 is installed upside down on top of the first paint tray liner 30, 32.

In another example, a paint tray 20, 22 includes a housing comprising a receptacle 48, 62 for holding paint. The housing has an upper edge that surrounds at least a first side and a second side of the perimeter of the housing. The upper edge of the paint tray 20, 22 has a downwardly facing edge, with the downwardly facing edge having a gripping portion 90 that coincides with an approximate location of a center of gravity of a paint load in the paint tray 20, 22.

The gripping portions 90 provide tactical feedback to the user to signal the location of the gripping portion 90. The gripping portion 90 may be a cut out. The cut out may be a scalloped edge. The cut out may be curvilinear. The upper edge of the paint tray 20, 22 surrounds the entire upper end of the housing, and the gripping portions 90 are provided on a left side and a right side of the paint tray 20, 22.

In another embodiment, a paint tray 20, 22 includes a housing defining a receptacle 48, 62 for holding paint. The housing has a side wall 64 that includes a notch 78 for stowing a brush and/or a mini roller.

The notch 78 may include a first surface 84 that is perpendicular to a bottom surface of the paint tray 20, 22 and a second surface 86 that is spaced from the first surface 84. The second surface 86 is angled relative to the perpendicular surface 84 and configured for stowing a paint brush that has an angled brush end. The perpendicular surface 84 is configured for stowing a mini-roller handle or a paint brush having a flat brush end.

The notch may include indicia 66 for signaling to a user what can be stored in the notch 78 recess. The notch 78 may be positioned adjacent a paint receptacle 62.

In another embodiment, a paint tray and paint tray liner include a paint tray and a paint tray liner that seats in the paint tray in close relation to the shape and size of the paint tray. The paint tray housing includes a receptacle for holding paint and/or a paint liner. The housing has an upper edge that surrounds at least a first side and a second side of the perimeter of the housing. The upper edge has an edge defining a gripping portion that coincides with an approximate location of a center of gravity of a paint load in the paint tray. The paint tray also includes a tool holder positioned on a side of the paint tray for holding a tool adjacent the receptacle for holding paint.

The upper edge of the paint tray may have a downwardly facing lip, and the gripping portion is formed on the lip. The gripping portion may have a scalloped edge that provides tactile feedback to a user when the user touches it. The gripping portion may be positioned at a non-center location on the side wall of the paint tray. The gripping portion may include two gripping portions, one on either side of the paint tray, with the gripping portions comprised of cut-out sections of the lip of the paint tray. The gripping portion may include two or more gripping portions.

The tool holder may include a notched-out portion of a sidewall of the paint tray, with the notched-out portion defining an area of the paint tray for storing tools. The notched-out portion comprises a first side edge, a second side edge, a bottom edge and an open upper end that extends through the upper edge of the paint tray, with the bottom edge being spaced from a bottom surface of the paint tray. The first side edge may be vertical or angled, the second side edge may be vertical or angled. The bottom edge may be horizontal. An upper end of the notched-out portion may cut into the upper edge of the paint tray, and a surface within the notched-out portion may include indicia or icons for communicating instructions to a user.

The paint tray liner may have a matching notched out portion on the side wall of the paint tray liner. The paint tray liner is for mating in close relation to the paint tray inner surface.

The term "substantially," if used herein, is a term of estimation.

While various features are presented above, it should be understood that the features may be used singly or in any combination thereof. Further, it should be understood that variations and modifications may occur to those skilled in the art to which the claimed examples pertain. The examples described herein are exemplary. The disclosure may enable those skilled in the art to make and use alternative designs having alternative elements that likewise correspond to the elements recited in the claims. The intended scope may thus include other examples that do not differ or that insubstantially differ from the literal language of the claims. The scope of the disclosure is accordingly defined as set forth in the appended claims.

What is claimed is:

1. A nesting paint bucket and paint tray system comprising:

a paint bucket having a length, a width, a depth, and an open upper end with a paint bucket upper edge defining a perimeter of the paint bucket open upper end and a receptacle for holding paint, with a paint bucket spout extending outwardly from the perimeter of the paint bucket; and a paint tray having a length, a width, and a depth that is less than the depth of the paint bucket and a paint tray open upper end with an upper edge of the paint tray defining a perimeter and a receptacle for holding paint, with a paint tray spout extending outwardly from the paint tray perimeter, said paint tray having a shape and size for nesting inside the open upper end of the paint bucket, and the shape of the paint tray is complementary to the shape of the paint bucket so that the paint tray substantially matches the shape of the paint bucket in the vicinity of the paint bucket spout;

wherein the paint bucket spout includes a well area for receiving paint that is separate from the receptacle for holding paint of the paint bucket, and the paint tray spout includes a well area for receiving paint that is separate from the receptacle for holding paint of the paint tray.

2. The system of claim 1, wherein the paint bucket spout is positioned in a corner of the paint bucket, and the paint tray spout is positioned in a corner of the paint tray.

3. The system of claim 1, wherein the paint bucket includes a rear wall and the rear wall of the paint bucket does not span the entire length of the paint bucket and ends adjacent the paint bucket spout.

4. The system of claim 1, wherein the paint tray includes a rear wall and the rear wall of the paint tray does not span the entire length of the paint tray and ends adjacent the paint tray spout.

5. The system of claim 1, wherein the length of the paint tray at a rear end thereof includes the paint tray rear wall and the paint tray spout.

6. The system of claim 1, wherein the length of the paint bucket at a rear end thereof includes the paint bucket rear wall and the paint bucket spout.

7. The system of claim 1, further comprising a paint tray liner having a shape and size to nest inside the paint tray.

8. A nesting paint bucket and paint tray system comprising:

a paint bucket having a length, a width, a depth, and an open upper end with a paint bucket upper edge defining a perimeter of the paint bucket open upper end and a receptacle for holding paint, with a paint bucket spout extending outwardly from the perimeter of the paint bucket; and a paint tray having a length, a width, and a depth that is less than the depth of the paint bucket and a paint tray open upper end with an upper edge of the paint tray defining a perimeter and a receptacle for holding paint, with a paint tray spout extending outwardly from the paint tray perimeter, said paint tray having a shape and size for nesting inside the open upper end of the paint bucket, and the shape of the paint tray is complementary to the shape of the paint bucket so that the paint tray substantially matches the shape of the paint bucket in the vicinity of the paint bucket spout;

wherein the paint tray has a length that is less than the length of the paint bucket and the paint tray has an upper lip that is sized and shaped to seat on the upper edge of the paint bucket, and the paint tray has at least two downwardly facing cut throughs on the upper lip to accommodate the upper edge of the paint bucket within the upper lip of the paint tray at an intermediate portion of the length of the paint bucket.

9. A nesting paint bucket and paint tray system comprising:

a paint bucket having an open upper end with a paint bucket upper edge defining a perimeter of the paint bucket open upper end and a receptacle for holding paint, the paint bucket including side walls, a rear wall, and a front wall extending downwardly from the paint bucket upper edge;

a paint tray having an open upper end with a paint tray upper edge defining a perimeter of the paint tray open upper end and a receptacle for holding paint, the paint tray including a left side wall, a right side wall, a rear wall, and a front wall extending downwardly from the paint tray upper edge, with a first foot positioned on the left side of the bottom of the paint tray left side wall and a second foot positioned on the right side of the bottom of the paint tray right side wall, the left foot and right foot extending along the length of the respective side wall, with the each foot permitting the paint tray to independently seat on a planar surface;

wherein at least one of the feet of the paint tray seat directly adjacent one of the side walls of the paint bucket when the paint tray rests inside the paint bucket.

10. The system of claim 9, wherein the paint tray includes a roll off surface extending from either the front or the rear wall of the paint tray and the feet are positioned directly adjacent sides of the paint tray roll off surface and the rear wall of the paint tray.

11. The system of claim 10, wherein each foot in an area adjacent the roll off surface includes a slanted surface that directs paint to a paint reservoir.

12. The system of claim 9, wherein:

the paint tray has a size and shape that is substantially the same as the entire size and shape of the upper end of the paint bucket and the paint tray provides a lid to seal the paint bucket for at least overnight storage; or the paint tray has a size and shape that is less than the shape of the open upper end of the paint bucket such that part of the upper end of the paint bucket remains open when the paint tray is installed on the paint bucket.

13. The system of claim 9, wherein:

with the paint bucket includes a first roll off surface attached to the rear wall and a second roll off surface attached to the front wall, with the receptacle for holding paint positioned between the first and second roll off surfaces; and the paint tray includes a paint tray roll off surface attached to the front wall of the paint tray, said paint tray having a shape and size for nesting inside the upper edge of the paint bucket, and the shape of the paint tray is complementary to the shape of the paint bucket along at least the front wall, rear wall, and at least one of the side walls.

14. The system of claim 13, wherein each roll off surface includes an upper end and a lower end, and the lower end is in communication with a paint reservoir positioned at a bottom end of the respective paint tray or paint bucket.

15. The system of claim 13, wherein the rear wall of the paint tray seats directly adjacent the roll off surface on the rear wall of the paint bucket.

16. The system of claim 13, wherein the first roll off surface of the paint bucket is angled at a first angle and at least part of the rear wall of the paint tray is angled at the first angle.

17. The system of claim 13, wherein the rear wall of the paint tray seats directly adjacent the first roll off surface of the paint bucket.

18. The system of claim 13, further comprising a spout extending outwardly from one corner of the paint bucket and a complementary spout extending outwardly from one corner of the paint tray.

19. The system of claim 9, wherein the upper edge of the paint tray is shaped and sized to clip around the upper edge of the paint bucket to permit the paint tray to nest inside the open upper end of the paint bucket.

20. A paint bucket and paint tray system comprising:

a paint bucket having a length, a width, a depth, and an open upper end with a paint bucket upper edge defining a perimeter of the paint bucket open upper end and a receptacle for holding paint, said paint bucket also including a front wall, a rear wall, a left side wall, and a right side wall, with a first roll off surface attached to the rear wall and a second roll off surface attached to the front wall, with the receptacle for holding paint positioned between the first and second roll off surfaces; and a paint tray having a length, a width, and a depth that is less than the depth of the paint bucket and a paint tray open upper end with an upper edge of the paint tray defining a perimeter and a receptacle for holding paint, the paint tray having a front wall, a rear wall, a left side wall, and a right side wall, with a paint tray roll off surface attached to the front wall of the paint tray, said paint tray having a shape and size for nesting inside the upper edge of the paint bucket, and the shape of the paint tray is complementary to the shape of the paint bucket along at least the front wall, rear wall, and at least one of the side walls, wherein the upper edge of the paint tray is shaped and sized to clip around the upper edge of the paint bucket to permit the paint tray to nest inside the open upper end of the paint bucket; and wherein the paint bucket includes four feet, one foot positioned in each corner of the paint bucket; and the paint tray includes two feet, one positioned on each side of the paint tray.

* * * * *